(12) United States Patent
Jin et al.

(10) Patent No.: US 12,255,032 B2
(45) Date of Patent: Mar. 18, 2025

(54) MAINTENANCE-FREE GAS DENSITY RELAY AND CROSS-CHECKING METHOD THEREFOR

(71) Applicant: SHANGHAI ROYE ELECTRIC CO., LTD., Shanghai (CN)

(72) Inventors: Haiyong Jin, Shanghai (CN); Tiexin Xia, Shanghai (CN); Xiaobeng Huang, Shanghai (CN); Zhengcao Guo, Shanghai (CN); Min Chang, Shanghai (CN); Lele Wang, Shanghai (CN)

(73) Assignee: SHANGHAI ROYE ELECTRIC CO., LTD., Shanghai (CN)

( * ) Notice: Subject to any disclaimer, the term of this patent is extended or adjusted under 35 U.S.C. 154(b) by 371 days.

(21) Appl. No.: 17/640,773

(22) PCT Filed: Aug. 26, 2020

(86) PCT No.: PCT/CN2020/111255
§ 371 (c)(1),
(2) Date: Mar. 4, 2022

(87) PCT Pub. No.: WO2021/043042
PCT Pub. Date: Mar. 11, 2021

(65) Prior Publication Data
US 2022/0336169 A1    Oct. 20, 2022

(30) Foreign Application Priority Data

Sep. 4, 2019   (CN) .......................... 201910830162.0
May 15, 2020   (CN) .......................... 202010416678.3

(51) Int. Cl.
*H01H 35/26*     (2006.01)
*G01K 15/00*     (2006.01)
(Continued)

(52) U.S. Cl.
CPC ............. *H01H 35/26* (2013.01); *G01K 15/00* (2013.01); *G01L 27/00* (2013.01); *G01N 9/26* (2013.01);
(Continued)

(58) Field of Classification Search
CPC .. H01H 1/64; H01H 1/66; H01H 9/02; H01H 9/0242; H01H 9/04; H01H 45/00;
(Continued)

(56) References Cited

U.S. PATENT DOCUMENTS

2018/0284752 A1* 10/2018 Cella .................... H04B 17/345

FOREIGN PATENT DOCUMENTS

| CN | 206945915 | 1/2018 |
| CN | 207966854 | 10/2018 |

(Continued)

*Primary Examiner* — Anthony R Jimenez
(74) *Attorney, Agent, or Firm* — Hsuanyeh Law Group, PC

(57) ABSTRACT

Provided are a maintenance-free gas density relay and a mutual check method therefor. The maintenance-free gas density relay includes a gas density relay body and first gas density detection sensors which are in communication on gas paths, and an intelligent control unit connected to the gas density relay body and the first gas density detection sensors separately, where the intelligent control unit compares and checks a first pressure value and a second pressure value acquired at the same gas pressure, and/or compares and checks a first temperature value and a second temperature value acquired at the same gas temperature, or compares and checks a first density value and a second density value acquired at the same gas density, and can further upload received data to a background for data comparison by the background. The present disclosure further completes online self-check or mutual check of the gas density relay while being used for monitoring gas density of a gas-insulated or (Continued)

arc-control electrical apparatus, thereby improving efficiency, avoiding maintenance, reducing cost, and ensuring safe operation of a power grid.

18 Claims, 3 Drawing Sheets

(51) Int. Cl.
    *G01L 27/00*     (2006.01)
    *G01N 9/26*     (2006.01)
    *H02B 13/065*     (2006.01)

(52) U.S. Cl.
    CPC ....... *H02B 13/065* (2013.01); *H01H 2300/02* (2013.01); *H01H 2300/052* (2013.01)

(58) Field of Classification Search
    CPC ............... H01H 45/02; H01H 2300/02; H01H 2300/052; H01H 35/18; H01H 35/24; H01H 35/26; H01H 35/2607; H01H 35/28; H01H 35/30; H01H 35/38; H01H 35/40; H02B 13/00; H02B 13/025; H02B 13/065; H02B 13/0356; H02B 13/0358; H02B 13/055; G01N 9/26; G01L 27/00; G01L 27/002; G01L 27/005; G01L 27/007; G01L 27/02; G01K 15/00; G01K 15/002; G01K 15/005; G01K 15/007
    USPC ......................................................... 200/81
See application file for complete search history.

(56) References Cited

FOREIGN PATENT DOCUMENTS

| | | |
|---|---|---|
| CN | 110534377 | 12/2019 |
| CN | 111463063 | 7/2020 |
| JP | 60-93729 | 5/1985 |
| JP | 10-327514 | 12/1998 |

\* cited by examiner

MAINTENANCE-FREE GAS DENSITY RELAY AND CROSS-CHECKING METHOD THEREFOR

CROSS-REFERENCE TO RELATED APPLICATIONS

The present disclosure claims the priority to the following patent applications:
1, application No. being 201910830162.0 (title of invention: maintenance-free gas density relay) filed on Sep. 4, 2019; and
2, application No. being 202010416678.3 (title of invention: maintenance-free gas density relay) filed on May 15, 2020.

TECHNICAL FIELD

The present disclosure relates to the technical field of electric power, and in particular to a maintenance-free gas density relay for high-voltage and medium-voltage electrical apparatuses and a mutual check method therefor.

BACKGROUND

Presently, a sulfur hexafluoride (SF6) electrical apparatus has been widely used for electric power departments and industrial and mining enterprises, which promotes rapid development of the electric power industry. In recent years, with high-speed development of economy, the capacity of a power system in China is sharply expanded, and the consumption of SF6 electrical apparatuses is increasing. SF6 gas has the effects of arc control and insulation in the high-voltage electrical apparatus, and if the density of the SF6 gas in the high-voltage electrical apparatus is reduced and the micro-water content exceeds the standard, safe operation of the SF6 high-voltage electrical apparatus is seriously affected: 1) the density of the SF6 gas is reduced to a certain degree, such that the insulation and arc control performance is lost; 2) under the participation of some metal objects, the SF6 gas can be subjected to a hydrolysis reaction with water at a high temperature of 200° C. or above to generate active HF and $SOF_2$ to corrode an insulating member and a metal member and generate a large amount of heat, such that the pressure of the air chamber is increased; and 3) when the temperature is reduced, excessive water may form condensed water, such that the surface insulation strength of the insulating member is obviously reduced, and even flashover is caused, resulting in serious harm. Therefore, the power grid operation regulations mandatorily stipulate that the density and the water content of SF6 gas must be regularly detected before and during apparatus operation.

With the development of an unattended transformer substation towards networking and digitalization and continuous reinforcement of requirements for remote control and remote measurement, it is of vital practical significance to monitor gas density and micro-water content state of the SF6 electrical apparatus online. With continuous and vigorous development of the intelligent power grid in China, the intelligent high-voltage electrical apparatus serving as an important component and a key node of an intelligent substation has an essential effect in the safety of the intelligent power grid. Presently, most high-voltage electrical apparatuses are SF6 gas insulation apparatuses, and if the gas density is reduced (for example, which is caused by leakage), the electrical performance of the apparatus is seriously affected, resulting in serious hidden dangers to safe operation. Presently, it has been very common to monitor the gas density value in the SF6 high-voltage electrical apparatus online, and accordingly, the use of a gas density monitoring system (gas density relay) is vigorously developed. A current system for monitoring gas density (gas density relay) is basically as follows: 1) a remote transmission type SF6 gas density relay is used for collecting and uploading density, pressure and temperature to monitor gas density online; and 2) a gas density transmitter is used for acquiring and uploading density, pressure and temperature to monitor gas density online. The SF6 gas density relay is a core and a key component, and the remote transmission type SF6 gas density relay or the gas density transmitter is a core and a key component and is very critical to ensure normal work of the remote transmission type SF6 gas density relay or the gas density transmitter.

Periodic inspection of the gas density relay on the electrical apparatus is a necessary measure to prevent problems and ensure safe and reliable operation of the electrical apparatus. The "power preventive test regulations" and the "twenty-five key requirements for preventing major accidents of power production" require that the gas density relay needs to be checked regularly; and in terms of actual operation conditions, regular check of the gas density relay is one of necessary means for ensuring safe and reliable operation of the power apparatus. In addition, if the online gas density monitoring device or the remote transmission type density relay is checked or inspected, a large amount of manpower and material resources are needed.

Therefore, presently, it is of great request to invent and create a maintenance-free gas density relay or a gas density monitoring device, which is used for a ubiquitous electric power Internet of Things based gas density monitoring system, and can mutually check a mechanical part and an electronic part of the gas density relay, thereby achieving maintenance free, improving efficiency and ensuring safety.

SUMMARY

The present disclosure provides a maintenance-free gas density relay (or a gas density monitoring device) for high-voltage or medium-voltage electrical apparatuses and a mutual check method therefor, which further complete online self-check or mutual check of the gas density relay while being used for monitoring gas density of a gas-insulated or arc-control electrical apparatus, thereby improving efficiency, avoiding maintenance, reducing cost, and ensuring safe operation of a power grid.

In order to achieve the above objective, the present disclosure uses the following technical solution:
a first aspect of the present disclosure discloses a maintenance-free gas density relay (or the gas density monitoring device), including: a gas density relay body, first gas density detection sensors and an intelligent control unit, where
the first gas density detection sensors are in communication with the gas density relay body on gas paths and are used for acquiring pressure values and temperature values, and/or gas density values; the intelligent control unit is connected to the gas density relay body and/or the first gas density detection sensors, and receives and/or computes data monitored by the gas density relay body and the first gas density detection sensors;
the intelligent control unit compares and checks a first pressure value and a second pressure value acquired at the same gas pressure; and/or the intelligent control unit compares and checks a first temperature value and a second temperature value acquired at the same gas temperature; or the intelligent control unit compares and checks a first density value and a second density value acquired at the same gas density to acquire a current working state of a monitoring part of the gas density relay; or, the intelligent control unit uploads received data to a background, and the background compares and checks the first pressure value and the second pressure value acquired at the same gas pressure; and/or the background compares and checks the first temperature value and the second temperature value acquired at the same gas temperature; or the background compares and checks the first density value and the second density value acquired at the same gas density to acquire the current working state of the monitoring part of the gas density relay, one or both of the first pressure value and the second pressure value being from the first gas density detection sensors or the gas density relay body, one or both of the first temperature value and the second temperature value being from the first gas density detection sensors or the gas density relay body, and one or both of the first density value and the second density value being from the first gas density detection sensors or the gas density relay body.

Preferably, the current working state of the monitoring part of the maintenance-free gas density relay (or the gas density monitoring device) includes a normal working state and an abnormal working state.

More preferably, the gas density relay (or the gas density monitoring device) sends out an abnormal prompt when the current working state is the abnormal working state.

Preferably, the gas density relay (or the gas density monitoring device) includes at least two first gas density detection sensors, where each of the first gas density detection sensors includes a pressure sensor and a temperature transducer; and the pressure values and the temperature values or the gas density values detected by the first gas density detection sensors are compared to complete mutual check of the first gas density detection sensors.

Preferably, the gas density relay (or the gas density monitoring device) further includes second gas density detection sensors, where each of the first gas density detection sensors and each of the second gas density detection sensors each include a pressure sensor and a temperature transducer; and the pressure values and the temperature values or the gas density values of the first gas density detection sensors are compared with pressure values and temperature values or gas density values detected by the second gas density detection sensors to complete mutual check of the first gas density detection sensors and the second gas density detection sensors.

More preferably, with a pressure value acquired by the pressure sensor of any one of the first gas density detection sensors and the second gas density detection sensors being a first pressure value PA, a temperature value acquired by the temperature transducer of any one of the first gas density detection sensors and the second gas density detection sensors being a first temperature value TA, a pressure value acquired by the pressure sensor of any another one of the first gas density detection sensors and the second gas density detection sensors being a second pressure value PB, and a temperature value acquired by the temperature transducer of any another one of the first gas density detection sensors and the second gas density detection sensors being a second temperature value TB, the intelligent control unit and/or the background compare/compares the first pressure value PA with the second pressure value PB to acquire a pressure difference |PA−PB|, and compare/compares the first temperature value TA with the second temperature value TB to acquire a temperature difference |TA−TB|; and the current working state of the monitoring part of the gas density relay (or the gas density monitoring device) is determined as a normal working state under the condition that the pressure difference |PA−PB| and/or the temperature difference |TA−TB| are/is within preset thresholds of the pressure difference and the temperature difference, and otherwise, the current working state of the monitoring part of the gas density relay (or the gas density monitoring device) is determined as an abnormal working state.

More preferably, with a gas density value acquired by any one of the first gas density detection sensors and the second gas density detection sensors being a first density value PA20, and a gas density value acquired by any another one of the first gas density detection sensors and the second gas density detection sensors being a second density value PB20, the intelligent control unit and/or the background compare/compares the first density value PA20 with the second density value PB20 to acquire a density difference |PA20−PB20|; and the current working state of the monitoring part of the gas density relay (or the gas density monitoring device) is determined as the normal working state under the condition that the density difference |PA20−PB20| is within a preset threshold of the density difference, and otherwise, the current working state of the monitoring part of the gas density relay (or the gas density monitoring device) is determined as the abnormal working state.

More preferably, the at least two second gas density detection sensors are arranged, and each of the second gas density detection sensors includes a pressure sensor and a temperature transducer; and pressure values and temperature values or gas density values detected by the second gas density detection sensors are compared to complete mutual check of the second gas density detection sensors.

More preferably, the mutual check method includes, but not limited to, one of corresponding difference values being within preset thresholds of the corresponding difference values, detection values being within set ranges of the detection values, and two corresponding detection values being divided within a preset threshold of the detection values.

Preferably, each of the first gas density detection sensors includes at least one pressure sensor and at least one temperature transducer; or each of the first gas density detection sensors is a gas density transmitter consisting of a pressure sensor and a temperature transducer; or each of the first gas density detection sensors is a density detection sensor using a quartz tuning fork technology.

Specifically, the density detection sensor using the quartz tuning fork technology utilizes a difference between a constant resonance frequency of a quartz oscillator located in vacuum and a resonance frequency of a homologous quartz oscillator locate in detected gas to be in direct proportion to density of the detected gas to obtain an analog signal or a digital signal of a gas density value after processing.

More preferably, the pressure sensors are mounted on the gas path of the gas density relay body.

More preferably, the temperature transducers are mounted on the gas density relay body, outside the gas path of the gas density relay body, in the gas density relay body, or outside gas density relay body.

More preferably, the at least one temperature transducer is arranged near a temperature compensation element of the gas density relay body, or is arranged on the temperature compensation element, or is integrated in the temperature compensation element. Preferably, the at least one temperature transducer is arranged at one end of a pressure detector close to the temperature compensation element of the gas density relay body.

More preferably, the intelligent control unit and/or the background compares an ambient temperature value with the temperature value of each of the temperature transducers to complete check of each of the temperature transducers.

Further, with a temperature value acquired by any one of the temperature transducers being a first temperature value TA, and an ambient temperature value being a second temperature value TB, the intelligent control unit and/or the background compare/compares the first temperature value TA with the second temperature value TB to acquire a temperature difference |TA−TB|; and the current working state of the monitoring part of the gas density relay (the gas density monitoring device) is determined as a normal working state under the condition that the temperature difference |TA−TB| is within a preset threshold of the temperature difference, and otherwise, the current working state of the monitoring part of the gas density relay (or the gas density monitoring device) is determined as an abnormal working state.

Further, the ambient temperature value is obtained by comprehensively determining temperature values of other detection points of a system consisting of the gas density relay (or the gas density monitoring device), or according to a weather forecast, or by comprehensively determining temperature values of other detection points of the same transformer substation.

More preferably, each of the first gas density detection sensors includes at least two pressure sensors, where pressure values acquired by the pressure sensors are compared to complete mutual check of the pressure sensors.

Further, with a pressure value acquired by any one of the pressure sensors being a first pressure value PA, and a pressure value acquired by any another one of the pressure sensors being a second pressure value PB, the intelligent control unit and/or the background compare/compares the first pressure value PA with the second pressure value PB to acquire a pressure difference |PA−PB|; and the current working state of the monitoring part of the gas density relay (the gas density monitoring device) is determined as the normal working state under the condition that the pressure difference |PA−PB| is within a preset threshold of the pressure difference, and otherwise, the current working state of the monitoring part of the gas density relay (or the gas density monitoring device) is determined as the abnormal working state.

More preferably, each of the first gas density detection sensors includes at least two temperature transducers, where temperature values acquired by the temperature transducers are compared to complete mutual check of the temperature transducers.

Further, with a temperature value acquired by any one of the temperature transducers being a first temperature value TA, and a temperature value acquired by any another one of the temperature transducers being a second temperature value TB, the intelligent control unit and/or the background compare/compares the first temperature value TA with the second temperature value TB to acquire a temperature difference |TA−TB|; and the current working state of the monitoring part of the gas density relay (or the gas density monitoring device) is determined as the normal working state under the condition that the temperature difference |TA−TB| is within a preset threshold of the temperature difference, and otherwise, the current working state of the monitoring part of the gas density relay (or the gas density monitoring device) is determined as the abnormal working state.

More preferably, each of the first gas density detection sensors includes at least one pressure sensor and at least one temperature transducer; pressure values acquired by the pressure sensors and temperature values acquired by the temperature transducers are randomly permutated and combined, combinations are converted into a plurality of pressure values corresponding to 20° C., that is, gas density values according to gas pressure-temperature characteristics, and the gas density values are compared to complete mutual check of the pressure sensors and the temperature transducers; or, the pressure values acquired by the pressure sensors and the temperature values acquired by the temperature transducers are fully permutated and combined, the combinations are converted into a plurality of pressure values corresponding to 20° C., that is, gas density values according to gas pressure-temperature characteristics, and the gas density values are compared to complete mutual check of the pressure sensors and the temperature transducers; or, the plurality of gas density values, the plurality of pressure values and the plurality of temperature values obtained by the pressure sensors and the temperature transducers are compared to complete mutual check of the gas density relay body, the pressure sensors and the temperature transducers. What is described above is completed by the background or the intelligent control unit.

More preferably, the temperature transducers may be thermocouple, thermistor and semiconductor types; may be contact and non-contact; may be thermal resistors and thermocouples; and may be digital and analog.

More preferably, the pressure sensors may further be diffused silicon pressure sensors, micro electro mechanical system (MEMS) pressure sensors, chip pressure sensors, coil induction pressure sensors (for example, pressure sensors having Bourdon tubes with induction coils), and resistance pressure sensors (for example, pressure sensors having Bourdon tubes with slide wire resistors); may be analog quantity pressure sensors or digital quantity pressure sensors.

Preferably, the gas density relay (or the gas density monitoring device) further includes a temperature regulating mechanism, the temperature regulating mechanism being a temperature-regulable regulating mechanism, and being configured to regulate temperature rise and fall of a temperature compensation element of the gas density relay body, so as to change gas density of the gas density relay body; with a contact signal value output when a contact of the gas density relay body acts and acquired by the intelligent control unit being a first density value PX20 and a preset contact signal value being a second density value PB20, the intelligent control unit and/or the background compare/compares the first density value PX20 with the second density value PB20 to acquire a contact signal difference value |PX20−PB20|; and the current working state of the monitoring part of the gas density relay (or the gas density monitoring device) is determined as a normal working state under the condition that the contact signal difference value |PX20−PB20| is within a preset threshold of the contact signal difference value, and otherwise, the current working state of the monitoring part of the gas density relay (or the gas density monitoring device) is determined as an abnormal working state.

Preferably, the gas density relay (or the gas density monitoring device) further includes a pressure regulating mechanism, the pressure regulating mechanism being a pressure-regulable regulating mechanism, and being configured to regulate pressure rise and fall of the gas density relay body, so as to change gas density of the gas density relay body; with a contact signal value output when a contact of the gas density relay body acts and acquired by the intelligent control unit being a first density value PX20 and a preset contact signal value being a second density value PB20, the intelligent control unit and/or the background compare/compares the first density value PX20 with the second density value PB20 to acquire a contact signal difference value |PX20−PB20|; and the current working state of the monitoring part of the gas density relay (or the gas density monitoring device) is determined as a normal working state under the condition that the contact signal difference value |PX20−PB20| is within a preset threshold of the contact signal difference value, and otherwise, the current working state of the monitoring part of the gas density relay (or the gas density monitoring device) is determined as an abnormal working state.

The above preset contact signal value is a contact signal value required by the standard (rated parameter) of the gas density relay body.

More preferably, the temperature regulating mechanism is a heating element; or,
    the temperature regulating mechanism includes a heating element, a heat insulation element, a temperature controller, a temperature detector and a temperature regulating mechanism outer shell. Or,
    the temperature regulating mechanism includes a heating element and a temperature controller; or,
    the temperature regulating mechanism includes a heating element, a heating power regulator and a temperature controller; or,
    the temperature regulating mechanism includes a heating element, a refrigeration element, a heating power regulator and a temperature controller; or,
    the temperature regulating mechanism includes a heating element, a heating power regulator and a thermostatic controller; or,
    the temperature regulating mechanism includes a heating element, a controller and a temperature detector; or,
    the temperature regulating mechanism is a heating element, and the heating element is arranged near the temperature compensation element of the gas density relay body; or,
    the temperature regulating mechanism is a miniature constant temperature box.

The at least one heating element is arranged, and the heating element includes, but not limited to, one of a silicon rubber heater (a silicon rubber heating plate, a silicon rubber heating tape and a silicon rubber heating wire), a resistance wire, an electric heating tape, an electric heating rod, a hot gas fan, an infrared ray heating element and a semiconductor; and
    the temperature controller is connected to the heating element and is used for controlling a heating temperature of the heating element, and the temperature controller includes, but not limited to, one of a proportion integration differentiation (PID) controller, a PID and fuzzy control combined controller, an inverter controller and a programmable logic controller (PLC).

More preferably, the pressure regulating mechanism is a closed air chamber, a heating element and/or a refrigeration element is arranged outside or inside the closed air chamber, and a temperature of gas in the closed air chamber is changed by means of heating of the heating element and/or refrigeration of the refrigeration element, thereby completing pressure rise and fall of the gas density relay body; or,
    the pressure regulating mechanism is a cavity having an opening at one end, and the other end of the cavity is in communication with the gas density relay body; a piston is arranged in the cavity, one end of the piston is connected to a regulating rod, the outer end of the regulating rod is connected to a drive part, the other end of the piston extends into the opening and makes sealed contact with an inner wall of the cavity, and the drive part drives the regulating rod to drive the piston to move in the cavity; or,
    the pressure regulating mechanism is a closed air chamber, a piston is arranged inside the closed air chamber, the piston makes sealed contact with an inner wall of the closed air chamber, a drive part is arranged outside the closed air chamber, and the drive part pushes the piston to move in the cavity by means of an electromagnetic force; or,
    the pressure regulating mechanism is an airbag of which one end is connected to a drive part, the volume of the airbag is changed under the driving of the drive part, and the airbag is in communication with the gas density relay body; or,
    the pressure regulating mechanism is a bellow, one end of the bellow is in communication with the gas density relay body, and the other end of the corrugated pipe extends under the driving of the drive part; or,
    the pressure regulating mechanism is a deflation valve, and the deflation valve is a solenoid valve, a valve with electrically motorized operation or other deflation valves implemented in an electric or pneumatic mode; or,
    the pressure regulating mechanism is a compressor; or,
    the pressure regulating mechanism is a pump, and the pump includes, but not limited to, one of a pressure pump, a booster pump, an electrical gas pump and an electromagnetic gas pump.

The drive part includes, but not limited to, one of a magnetic force, an electric motor, a reciprocating motion mechanism, a Carnot cycle mechanism and a pneumatic element.

Preferably, the gas density relay body includes a housing, and a base, a pressure detector, a temperature compensation element, a comparison annunciator and at least one signal generator which are arranged in the housing, monitors gas density by means of the pressure detector and the temperature compensation element, and outputs a contact signal value by means of the signal generator;
    the gas density relay body further has a comparison pressure value output signal, and the comparison annunciator outputs the comparison pressure value output signal when gas pressure of the gas density relay body monitored by the pressure detector rises or falls to a set gas pressure value, and the comparison pressure value output signal is connected with the intelligent control unit; and/or,
    the gas density relay body further has a comparison density value output signal, and the comparison annunciator outputs the comparison density value output signal when gas density of the gas density relay body monitored by the pressure detector and the temperature compensation element rises or falls to a set gas density value, and the comparison density value output signal is connected to the intelligent control unit.

More preferably, the contact signal includes alarming, and/or blocking.

More preferably, the comparison annunciator includes, but not limited to, one of a microswitch, an electric contact, a mercury switch, a photoelectric switch, a reed switch, a proximity switch, an electronic switch, a variable resistor, a voltage measurer and a current measurer.

More preferably, the signal generator includes, but not limited to, one of a microswitch, an electric contact, a mercury switch, a photoelectric switch, a reed switch, a proximity switch, and an electronic switch.

More preferably, the pressure detector includes, but not limited to, one of a Bourdon tube, a bellow, a bellow+a spring and a pressure sensor.

More preferably, with the comparison pressure value output signal output by the comparison annunciator being a first pressure value PS, and pressure values acquired by the first gas density detection sensors at the same moment being second pressure values PJ, the intelligent control unit and/or the background compare/compares the first pressure value PS with the second pressure values PJ to acquire pressure differences |PJ−PS|; and the current working state of the monitoring part of the gas density relay (or the gas density monitoring device) is determined as a normal working state under the condition that the pressure differences |PJ−PS| are within a preset threshold of the pressure differences, and otherwise, the current working state of the monitoring part of the gas density relay (or the gas density monitoring device) is determined as an abnormal working state.

More preferably, with the comparison density value output signal output by the comparison annunciator being a first density value PS20, and gas density values acquired by the first gas density detection sensors at the same moment being second density values PJ20, the intelligent control unit and/or the background compare/compares the first density value PS20 with the second density values PJ20 to acquire density differences |PJ20−PS20|; and the current working state of the monitoring part of the gas density relay (or the gas density monitoring device) is determined as the normal working state under the condition that the density differences |PJ20−PS20| are within a preset threshold of the density differences, and otherwise, the current working state of the monitoring part of the gas density relay (or the gas density monitoring device) is determined as the abnormal working state.

Preferably, the gas density relay or the gas density monitoring device further includes a camera; with a pointer display value or a number display value of the gas density relay body acquired by the camera by means of a head portrait recognition technology being a first density value PZ20, and gas density values acquired by the first gas density detection sensors at the same moment being second density values PJ20, the intelligent control unit and/or the background compare/compares the first density value PZ20 with the second density values PJ20 to acquire density differences |PJ20−PZ20|; and the current working state of the monitoring part of the gas density relay or the gas density monitoring device is determined as a normal working state under the condition that the density differences |PJ20−PZ20| are within a preset threshold of the density differences, and otherwise, the current working state of the monitoring part of the gas density relay or the gas density monitoring device is determined as an abnormal working state.

Preferably, the intelligent control unit acquires the gas density values acquired by the first gas density detection sensors; or, the intelligent control unit acquires the pressure values and the temperature values acquired by the first gas density detection sensors to online monitor the gas density by the gas density relay or the gas density monitoring device, that is, online monitor the gas density of the monitored electrical apparatus.

More preferably, the intelligent control unit computes the gas density value by using a mean value method (average value method), and the mean value method includes: setting an acquisition frequency within a set time interval, and computing an average value of all acquired N gas density values at different time points to obtain a gas density value; or,
setting a temperature interval step length within the set time interval, and computing an average value of the density values corresponding to N different temperature values acquired within all temperature ranges to obtain a gas density value; or,
setting a pressure interval step length within the set time interval, and computing an average value of density values corresponding to N different pressure values acquired within all pressure change ranges to obtain a gas density value,
where N is a positive integer greater than or equal to 1.

Preferably, the intelligent control unit acquires gas density values acquired by the first gas density detection sensors when the gas density relay body is subjected to contact action or switching, so as to complete online check of the gas density relay (or the gas density monitoring device); or,
the intelligent control unit acquires the pressure values and the temperature values acquired by the first gas density detection sensors when the gas density relay body is subjected to contact action or switching, and converts the pressure values and the temperature values into pressure values corresponding to 20° C., that is, gas density values according to gas pressure-temperature characteristics, so as to complete online check of the gas density relay (or the gas density monitoring device).

Preferably, the gas density relay body and the first gas density detection sensors are of an integrated structure.

Preferably, the gas density relay body and the first gas density detection sensors are remote transmission type gas density relays of an integrated structure.

Preferably, the gas density relay body includes, but not limited to, a bimetallic strip compensated gas density relay, a gas compensated gas density relay, a hybrid bimetallic strip and gas compensated gas density relay, a completely mechanical gas density relay, a digital gas density relay, a mechanical and digital combined gas density relay, a gas density relay having pointer display, a digital display type gas density relay, a gas density switch without display or indication, an SF6 gas density relay, an SF6 mixed gas density relay and a N2 gas density relay.

The digital gas density relay body may be internally provided with the intelligent control unit (that is, the intelligent control unit is integrated in an integrated circuit or a chip of the digital gas density relay body, or the integrated circuit or the chip of the digital gas density relay body is used as the intelligent control unit in the present disclosure), or the intelligent control unit may be separately arranged outside the digital gas density relay body (that is, the intelligent control unit in the present disclosure is not integrated in the integrated circuit or the chip of the digital gas density relay body, and the integrated circuit or the chip of the digital gas density relay body is not used as the intelligent control unit in the present invention) when the gas density relay body is the digital gas density relay.

Preferably, the first gas density detection sensors are of an integrated structure. Preferably, the first gas density detection sensors are gas density transmitters of integrated structures.

Preferably, the intelligent control unit completes a check report, gives an alarm if abnormality occurs, and uploads the abnormality to a far end or sends the check report to a specified receiver.

Preferably, the intelligent control unit is provided with an electrical interface, and the electrical interface is used for completing test data storage, and/or test data export, and/or test data printing, and/or data communication with an upper computer, and/or input of analog quantity and digital quantity information.

Preferably, the intelligent control unit further includes a communication module for achieving long-distance transmission of test data and/or a self-check result, and a communication mode of the communication module is a wire communication mode or a wireless communication mode.

Preferably, the intelligent control unit is further provided with a clock, and the clock is configured to be used for regularly setting self-check time of the gas density relay body, or recording test time, or recording event time.

Preferably, the gas density relay (or the gas density monitoring device) further includes a multichannel joint, where the gas density relay body, the first gas density detection sensors and the intelligent control unit are arranged on the multichannel joint.

Preferably, the gas density relay (or the gas density monitoring device) further includes a display interface used for man-machine interaction, where the display interface is connected to the intelligent control unit and used for displaying current check data in real time and/or supporting data input.

Preferably, the gas density relay (or the gas density monitoring device) further includes a micro-water sensor connected to the gas density relay body and the intelligent control unit separately, and/or a decomposer sensor connected to the gas density relay body and the intelligent control unit separately.

Preferably, the gas density relay (or the gas density monitoring device) further includes a contact resistance detection unit, where the contact resistance detection unit is in signal connection with a contact of the gas density relay body or is directly connected to the signal generator in the gas density relay body; and when the contact of the gas density relay body acts, and/or an instruction for detecting a contact resistance of the contact is received, the contact resistance detection unit may detect a contact resistance value of the contact of the gas density relay body.

Preferably, at least two gas density relays (or gas density monitoring devices) are both connected to a remote background detection system by means of communication apparatuses, the gas density relays (or the gas density monitoring devices) being arranged on electrical apparatuses of air chambers corresponding to the gas density relays.

More preferably, a communication mode of each of the communication apparatuses includes a wire communication mode and a wireless communication mode.

Further, the wire communication mode includes one or more of an RS232 bus, an RS485 bus, a controller area network (CAN)-BUS bus, 4-20 mA, Hart, an Inter-integrated circuit (IIC), a serial peripheral interface (SPI), Wire, a coaxial cable, a power line carrier (PLC) and a cable.

Further, the wireless communication mode includes one or more of a 5th generation mobile communication technology (5G)/narrow band Internet of Things (NB-IOT) communication module (for example, 5G, NB-IOT) arranged in a sensor, 2th generation mobile communication technology (2G)/3th generation mobile communication technology (3G)/4th generation mobile communication technology (4G)/5G, WIFI, Bluetooth, Lora, Lorawan, Zigbee, infrared, ultrasonic, sound wave, satellite, light wave, quantum communication and sonar.

Preferably, control of the intelligent control unit is implemented by means of field control and/or background control.

More preferably, the intelligent control unit completes online check of the gas density relay (or the gas density monitoring device) according to setting of a remote background detection system or a remote control instruction; or, online check of the gas density relay (or the gas density monitoring device) is completed according to set check time of the gas density relay.

More preferably, at least two gas density relays (or the gas density monitoring devices) are sequentially connected to the remote background detection system by means of a concentrator and a protocol converter, where the gas density relays (or the gas density monitoring devices) are arranged on electrical apparatuses of air chambers corresponding to the gas density relays (or the gas density monitoring devices).

Further, the concentrator uses an RS485 concentrator.

Further, the protocol converter uses an integrated Ethernet chip 61850 (IEC61850) or integrated Ethernet chip 104 (IEC104) protocol converter.

Further, the protocol converter is further connected to a network service printer and a network data router separately.

A second aspect of the present disclosure discloses a mutual check method for the above maintenance-free gas density relay, including:
communicating first gas density detection sensors with a gas density relay body on gas paths;
connecting an intelligent control unit to the gas density relay body and/or the first gas density detection sensors; and
comparing and checking, by the intelligent control unit, a first pressure value and a second pressure value acquired at the same gas pressure; and/or comparing and checking, by the intelligent control unit, a first temperature value and a second temperature value acquired at the same gas temperature; or comparing and checking, by the intelligent control unit, a first density value and a second density value acquired at the same gas density to acquire a current working state of a monitoring part of the gas density relay; or,
uploading, by the intelligent control unit, received data to a background, and comparing and checking, by the background, the first pressure value and the second pressure value acquired at the same gas pressure; and/or comparing and checking, by the background, the first temperature value and the second temperature value acquired at the same gas temperature; or comparing and checking, by the background, the first density value and the second density value acquired at the same gas density to acquire the current working state of the monitoring part of the gas density relay,
where one or both of the first pressure value and the second pressure value are from the first gas density detection sensors or the gas density relay body, one or both of the first temperature value and the second temperature value are from the first gas density detection sensors or the gas density relay body, and one or both of the first density value and the second density value are from the first gas density detection sensors or the gas density relay body.

Preferably, the at least two first gas density detection sensors are arranged, and each of the first gas density detection sensors includes a pressure sensor and a temperature transducer; the gas density relay further includes second gas density detection sensors, each of the first gas density detection sensors and each of the second gas density detection sensors each including a pressure sensor and a temperature transducer; and the mutual check method further includes:

with a pressure value acquired by the pressure sensor of any one of the first gas density detection sensors and the second gas density detection sensors being a first pressure value PA, a temperature value acquired by the temperature transducer of any one of the first gas density detection sensors and the second gas density detection sensors being a first temperature value TA, a pressure value acquired by the pressure sensor of any another one of the first gas density detection sensors and the second gas density detection sensors being a second pressure value PB, and a temperature value acquired by the temperature transducer of any another one of the first gas density detection sensors and the second gas density detection sensors being a second temperature value TB, comparing, by the intelligent control unit or the background, the first pressure value PA with the second pressure value PB to acquire a pressure difference |PA−PB|, and comparing, by the intelligent control unit or the background, the first temperature value TA with the second temperature value TB to acquire a temperature difference |TA−TB|; and determining the current working state of the monitoring part of the gas density relay as a normal working state under the condition that the pressure difference |PA−PB| and/or the temperature difference |TA−TB| are/is within preset thresholds of the pressure difference and the temperature difference, and otherwise, determining the current working state of the monitoring part of the gas density relay as an abnormal working state; or, with a gas density value acquired by any one of the first gas density detection sensors and the second gas density detection sensors being a first density value PA20, and a gas density value acquired by any another one of the first gas density detection sensors and the second gas density detection sensors being a second density value PB20, comparing, by the intelligent control unit and/or the background, the first density value PA20 with the second density value PB20 to acquire a density difference |PA20−PB20|; and determining the current working state of the monitoring part of the gas density relay as the normal working state under the condition that the density difference |PA20−PB20| is within a preset threshold of the density difference, and otherwise, determining the current working state of the monitoring part of the gas density relay as the abnormal working state.

Preferably, each of the first gas density detection sensors includes at least one pressure sensor and at least one temperature transducer; and the mutual check method further includes:

with a temperature value acquired by any one of the temperature transducers being a first temperature value TA, and an ambient temperature value being a second temperature value TB, comparing, by the intelligent control unit and/or the background, the first temperature value TA with the second temperature value TB to acquire a temperature difference |TA−TB|; and determining the current working state of the monitoring part of the gas density relay as a normal working state without maintenance under the condition that the temperature difference |TA−TB| is within a preset threshold of the temperature difference, and otherwise, determining the current working state of the monitoring part of the gas density relay as an abnormal working state; or, with a pressure value acquired by any one of the pressure sensors being a first pressure value PA, and a pressure value acquired by any another one of the pressure sensors being a second pressure value PB, comparing, by the intelligent control unit and/or the background, the first pressure value PA with the second pressure value PB to acquire a pressure difference |PA−PB|; and determining the current working state of the monitoring part of the gas density relay as the normal working state without maintenance under the condition that the pressure difference |PA−PB| is within a preset threshold of the pressure difference, and otherwise, determining the current working state of the monitoring part of the gas density relay as the abnormal working state; or, with a temperature value acquired by any one of the temperature transducers being a first temperature value TA, and a temperature value acquired by any another one of the temperature transducers being a second temperature value TB, comparing, by the intelligent control unit and/or the background, the first temperature value TA with the second temperature value TB to acquire a temperature difference |TA−TB|; and determining the current working state of the monitoring part of the gas density relay as the normal working state without maintenance under the condition that the temperature difference |TA−TB| is within a preset threshold of the temperature difference, and otherwise, determining the current working state of the monitoring part of the gas density relay as the abnormal working state.

Preferably, each of the first gas density detection sensors includes at least one pressure sensor and at least one temperature transducer; and the mutual check method further includes:

randomly permutating and combining pressure values acquired by the pressure sensors and temperature values acquired by the temperature transducers, converting combinations into a plurality of pressure values corresponding to 20° C., that is, gas density values according to gas pressure-temperature characteristics, and comparing the gas density values to complete mutual check of the pressure sensors and the temperature transducers; or, fully permutating and combining the pressure values acquired by the pressure sensors and the temperature values acquired by the temperature transducers, converting the combinations into a plurality of pressure values corresponding to 20° C., that is, gas density values according to gas pressure-temperature characteristics, and comparing the gas density values to complete mutual check of the pressure sensors and the temperature transducers; or, comparing the plurality of gas density values, the plurality of pressure values and the plurality of temperature values obtained by the pressure sensors and the temperature transducers to complete mutual check of the gas density relay body, the pressure sensors and the temperature transducers.

Preferably, the gas density relay further includes a temperature regulating mechanism, the temperature regulating mechanism being a temperature-regulable regulating mechanism, and being configured to regulate temperature rise and fall of a temperature compensation element of the gas density relay body, so as to change gas density of the gas density relay body; and the mutual check method further includes:

arranging the temperature regulating mechanism inside or outside a housing of the gas density relay body;

connecting the temperature regulating mechanism to the intelligent control unit;

with a contact signal value output when a contact of the gas density relay body acts and acquired by the intelligent control unit being a first density value PX20 and a preset contact signal value being a second density value PB20, comparing, by the intelligent control unit and/or the background, the first density value PX20 with the second density value PB20 to acquire a contact signal difference value |PX20−PB20|; and determining the current working state of the monitoring part of the gas density relay as a normal working state without maintenance under the condition that the contact signal difference value |PX20−PB20| is within a preset threshold of the contact signal difference value, and otherwise, determining the current working state of the monitoring part of the gas density relay as an abnormal working state.

Preferably, the gas density relay further includes a pressure regulating mechanism, the pressure regulating mechanism being a pressure-regulable regulating mechanism, and being configured to regulate pressure rise and fall of the gas density relay body, so as to change gas density of the gas density relay body; and the mutual check method further includes:

communicating a gas path of the pressure regulating mechanism with a gas path of the gas density relay body;

connecting the pressure regulating mechanism to the intelligent control unit;

with a contact signal value output when a contact of the gas density relay body acts and acquired by the intelligent control unit being a first density value PX20 and a preset contact signal value being a second density value PB20, comparing, by the intelligent control unit and/or the background, the first density value PX20 with the second density value PB20 to acquire a contact signal difference value |PX20−PB20|; and determining the current working state of the monitoring part of the gas density relay as a normal working state without maintenance under the condition that the contact signal difference value |PX20−PB20| is within a preset threshold of the contact signal difference value, and otherwise, determining the current working state of the monitoring part of the gas density relay as an abnormal working state.

Preferably, the gas density relay body further has a comparison pressure value output signal and/or a comparison density value output signal, the comparison pressure value output signal being used for monitoring gas pressure by means of a pressure detector of the gas density relay body and being output by means of a comparison annunciator of the gas density relay body, and the comparison density value output signal being used for monitoring gas density by means of the pressure detector and a temperature compensation element of the gas density relay body, and being output by means of the comparison annunciator of the gas density relay body; and the mutual check method further includes:

connecting the comparison pressure value output signal with the intelligent control unit; and/or, connecting the comparison density value output signal with the intelligent control unit;

with the comparison pressure value output signal output by the comparison annunciator being a first pressure value PS, and pressure values acquired by the first gas density detection sensors at the same moment being second pressure values PJ, comparing, by the intelligent control unit and/or the background, the first pressure value PS with the second pressure values PJ to acquire pressure differences |PJ−PS|; and determining the current working state of the monitoring part of the gas density relay as a normal working state without maintenance under the condition that the pressure differences |PJ−PS| are within a preset threshold of the pressure differences, and otherwise, determining the current working state of the monitoring part of the gas density relay as an abnormal working state; and/or, with the comparison density value output signal output by the comparison annunciator being a first density value PS20, and gas density values acquired by the first gas density detection sensors at the same moment being second density values PJ20, comparing, by the intelligent control unit and/or the background, the first density value PS20 with the second density values PJ20 to acquire density differences |PJ20−PS20|; and determining the current working state of the monitoring part of the gas density relay as the normal working state without maintenance under the condition that the density differences |PJ20−PS20| are within a preset threshold of the density differences, and otherwise, determining the current working state of the monitoring part of the gas density relay as the abnormal working state.

Preferably, the gas density relay further includes a camera; and the mutual check method further includes:

connecting the camera to the intelligent control unit;

with a pointer display value or a number display value of the gas density relay body acquired by the camera by means of a head portrait recognition technology being a first density value PZ20 and gas density values acquired by the first gas density detection sensors at the same moment being second density values PJ20, comparing, by the intelligent control unit and/or the background, the first density value PZ20 with the second density values PJ20 to acquire density differences |PJ20−PZ20|; and determining the current working state of the monitoring part of the gas density relay as a normal working state without maintenance under the condition that the density differences |PJ20−PZ20| are within a preset threshold of the density differences, and otherwise, determining the current working state of the monitoring part of the gas density relay as an abnormal working state.

The first pressure value and the second pressure value acquired at the same gas pressure are compared and checked; and/or the first temperature value and the second temperature value acquired at the same gas temperature are compared and checked; or, the intelligent control unit may perform comparison computation on the first density value and the second density value acquired at the same gas density, and may further transmit the data to the background, and the background compares and computes the data.

Compared with the prior art, the technical solution of the present disclosure has the following beneficial effects:

1) the maintenance-free gas density relay is provided, and further completes online self-check or mutual check of the gas density relay while being used for monitoring gas density of a gas-insulated or arc-control electrical apparatus, thereby improving efficiency, avoiding maintenance, reducing cost, and ensuring safe operation of a power grid.

2) the mutual check method for a maintenance-free gas density relay is provided, and may support normal operation of the above maintenance-free gas density relay.

BRIEF DESCRIPTION OF DRAWINGS

The accompanying drawings constituting a part of the present disclosure serve to provide a further understanding of the present disclosure, and the illustrative embodiments of the present disclosure and the description of the illustrative embodiments serve to explain the present disclosure and are not to be construed as unduly limiting the present disclosure. In the figures.

DETAILED DESCRIPTION OF THE EMBODIMENTS

Embodiment 1

Figure 1:
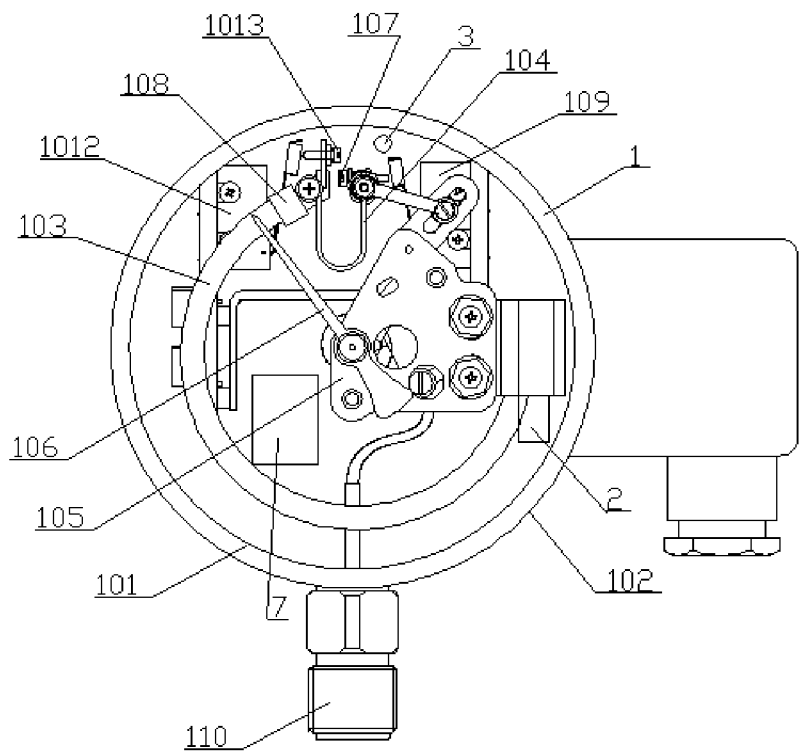
FIG. 1 is a structural schematic diagram of a maintenance-free gas density relay for high-voltage or medium-voltage electrical apparatuses in embodiment 1.

FIG. 1 is a structural schematic diagram of a maintenance-free gas density relay for high-voltage and medium-voltage electrical apparatuses in embodiment 1 of the present disclosure. As shown in FIG. 1, the maintenance-free gas density relay mainly includes a gas density relay body 1, gas density detection sensors (a pressure sensor 2 and a temperature transducer 3) and an intelligent control unit 7, where the pressure sensor 2 of the gas density detection sensors is in communication with the gas density relay body 1 on a gas path. The maintenance-free gas density relay further includes a mutual self-check unit, where data detected by the mutual self-check unit are compared by means of the intelligent control unit 7 to avoid maintenance; or the detected data are compared by means of the intelligent control unit 7 and the mutual self-check unit to avoid maintenance.

In this embodiment, the mutual self-check unit consists of a comparison pressure value output signal and a pressure sensor 2. The gas density relay body 1 includes a housing 102, and a base, a pressure detector 103, a temperature compensation element 104, an end seat 108, several signal generators 109, a comparison annunciator 1012 and a comparison signal regulating member 1013 which are arranged in the housing 102, where each of the signal generators 109 includes a microswitch or a magnetically assisted electric contact, and the gas density relay body 1 outputs contact signals by means of the signal generators 109; the pressure detector 103 includes a Bourdon tube or a bellow; and the temperature compensation element 104 uses a temperature compensation sheet or gas enclosed with the housing. In this embodiment, the comparison annunciator 1012 is a microswitch, of which voltage may be a weak current level (1 v-36 v) and a commercial power level (110 v-220 v). Each of the signal generators 109 includes the microswitch (or the magnetically assisted electric contact), and the gas density relay body 1 monitors gas density by means of the pressure detector 103 and the temperature compensation element 104 and outputs a gas density contact signal by means of the signal generators 109, of which the principle is that the temperature compensation element 104 is utilized to correct changed pressure and temperature to reflect a change of sulfur hexafluoride gas density on the basis of the pressure detector 103. That is, under the pressure effect of a detected medium sulfur hexafluoride (SF6) gas, due to the effect of the temperature compensation element 104, when a gas density value of the sulfur hexafluoride (or other) is changed, a pressure value of the sulfur hexafluoride gas is changed correspondingly, a tail end of the pressure detector 103 is forced to generate corresponding elastic deformation displacement, the elastic deformation displacement is transmitted to a machine core 105 by means of the temperature compensation element 104, and the machine core 105 transmits the elastic deformation displacement to a pointer 106 to gradually indicate the gas density value of the measured sulfur hexafluoride on a dial. The signal generators 109 serve as output alarm blocking contacts. Therefore, the gas density relay body 1 may display the gas density value of the sulfur hexafluoride. If the gas leaks and the gas density value of the sulfur hexafluoride is reduced, the pressure detector 103 generates corresponding downward displacement, the downward displacement is transmitted to the machine core 105 by means of the temperature compensation element 104, the machine core 105 transmits the downward displacement to the pointer 106, and the pointer 106 moves towards a direction in which an indicating value becomes small to specifically display a gas leakage degree on the dial; and meanwhile, the pressure detector 103 drives a cross beam to move downwards by means of the temperature compensation element 104, a regulating member 107 on the cross beam is gradually separated from the signal generators 109, and when the regulating member is gradually separated from the signal generators to a certain extent, contacts of the signal generators 109 are connected to send out corresponding contact signals (alarming or blocking), so as to monitor and control the sulfur hexafluoride gas density in apparatuses of an electrical switch, etc., and make the electrical apparatuses work safely. If the gas density value is increased, that is, a sulfur hexafluoride gas pressure value in a sealed air chamber is greater than a set sulfur hexafluoride gas pressure value, the pressure value is increased correspondingly, a tail end of the pressure detector 103 and the temperature compensation element 104 generate correspondingly upward displacement, the temperature compensation element 104 makes the cross beam move upwards, and the regulating member 107 on the cross beam moves upwards and pushes the contacts of the signal generators 109 to be disconnected, such that the contact signals (alarming or blocking) are released.

A comparison pressure value output signal is used for monitoring gas pressure by means of the pressure detector 103 and is output by means of the comparison annunciator 1012, of which a working principle is that a pressure value of the (sulfur hexafluoride) gas is changed correspondingly along with a change of an ambient temperature, the tail end of the pressure detector 103 is forced to generate corresponding elastic deformation displacement when the pressure value is changed, and when the gas pressure value reaches a pressure value $P_S$ corresponding to a set comparison pressure value output signal, the pressure detector 103 drives a comparison signal regulating member 1013 to trigger the comparison annunciator 1012 by means of the end seat 108, and the comparison annunciator 1012 outputs a comparison pressure value signal of a set value. The mutual self-check unit consists of the comparison pressure value output signal and a pressure sensor 2. That is, when a gas pressure monitored by the gas density relay falls or rises to a specified (or set) comparison pressure value $P_S$, the comparison annunciator 1012 outputs the comparison pressure value output signal of the set value. The signal may be connected to a remote transmission type gas density relay or a gas density monitoring device (or system), for example, the signal is connected with the intelligent control unit 7, and a pressure change caused by an ambient temperature change or a pressure change caused by pressure regulation of a pressure regulating mechanism when the gas path is closed may be utilized, a current gas pressure value $P_J$ acquired by the intelligent control unit 7 of an electronic part of the remote transmission type gas density relay or the gas density monitoring device (or system) is a gas pressure value $P_J$ acquired by the electronic part when the comparison annunciator 1012 outputs the comparison pressure value output signal. Briefly speaking, at the same gas pressure value, the comparison pressure value $P_S$ is a pressure value detected by the pressure detector 103 of a mechanical part of the gas density relay, and the $P_J$ value is the gas pressure value acquired by the electronic part of the gas density relay (mainly by the pressure sensor). The remote transmission type gas density relay or the gas density monitoring device (or system) compares the detected gas pressure value $P_J$ with the detected comparison pressure value $P_S$, and if consistency of the gas pressure value and the comparison pressure value is optimal, it is indicated that a monitoring part for monitoring pressure online of the remote transmission type gas density relay or the gas density monitoring device (or system) works normally without maintenance. That is, $|P_J-P_S|$ is within an allowable set value of |PJ-PS|, it is indicated that the monitoring part for monitoring pressure online of the remote transmission type gas density relay or the gas density monitoring device (or system) works normally, and the pressure detector 103 of the gas density relay works normally without maintenance. A pressure value range corresponding to the comparison pressure value output signal is 60%-130% of a pressure value at 20° C. corresponding to a rated value of the gas density relay body. For example, for a gas density relay body having a rated pressure of 0.6 MPa, a pressure value range corresponding to a comparison pressure value output signal of the gas density relay body is 0.36 MPa-0.78 MPa, and specifically, the pressure value range may be reasonably set according to a weather temperature of an area in which the gas density relay body is located.

It needs to be noted that when the gas density relay body is a digital gas density relay, the digital gas density relay body may be internally provided with the intelligent control unit, or the intelligent control unit may be additionally and separately arranged.

For example, the digital gas density relay body is internally provided with an integrated circuit or a chip, the function of the intelligent control unit (that is, the intelligent control unit) may be achieved by writing a program, or the function of the intelligent control unit (that is, the intelligent control unit) may be achieved by using a programmable controller or a chip and subsequently writing a program, and in such a case, an intelligent control unit is not additionally arranged in the present disclosure. Specifically, the maintenance-free digital (or digital) gas density relay or the gas density monitoring device includes a gas density relay body and first gas density detection sensors, where the gas density relay body includes a relay body density detection sensor, an annunciator, a communication module and an intelligent control unit. The relay body density detection sensor is in communication with the first gas density detection sensors on gas paths and is used for acquiring a pressure value, a temperature value and/or a gas density value; the intelligent control unit is connected to the relay body density detection sensor, the annunciator, the communication module and the first gas density detection sensors separately; the intelligent control unit acquires the gas density value acquired by the relay body density detection sensor; or the intelligent control unit acquires the pressure value and/or the temperature value acquired by the relay body density detection sensor, and converts the pressure value and/or the temperature value into a gas density value according to gas pressure-temperature characteristics; the intelligent control unit uploads one or more of the gas density value, the pressure value and the temperature value by means of the communication module to online monitor gas density of a monitored electrical apparatus by the gas density relay; when the gas density value is lower than and/or higher than a set contact preset threshold, the intelligent control unit controls the annunciator to make the annunciator output an alarm and/or block a contact signal, so as to complete monitoring of the gas density value in the electrical apparatus; the intelligent control unit is used for comparing and diagnosing the gas pressure value $P_S$ acquired by the relay body density detection sensor and the gas pressure value $P_J$ acquired by the first gas density detection sensor at the same gas pressure, if $|P_J-P_S|$ is within an allowable set value of |PJ-PS|, it is indicated that the monitoring part for monitoring pressure online of the digital gas density relay or the gas density monitoring device (or system) works normally, and the pressure detector of the relay body density detection sensor of the digital gas density relay works normally without maintenance; and/or the intelligent control unit performs comparison diagnosis on a temperature value TA acquired by the relay body density detection sensor and temperature values TB acquired by the first gas density detection sensors at the same gas temperature; or, the intelligent control unit compares and diagnoses a gas density value $P_{S20}$ acquired by the relay body density detection sensor and gas density values $P_{J20}$ acquired by the first gas density detection sensors at the same gas density to acquire a current working state of the monitoring part of the gas density relay, and if $|P_{J20}-P_{S20}|$ is within an allowable set value of |PJ20-PS20|, it is indicated that the monitoring part for monitoring density online of the gas density relay or the gas density monitoring device (or system) works normally without maintenance. Or, the intelligent control unit uploads received data to a background by means of the communication module, and the background compares and diagnoses the gas pressure value acquired by the relay body density detection sensor and the gas pressure values acquired by the first gas density detection sensors at the same gas pressure; and/or the background compares and diagnoses the temperature value acquired by the relay body density detection sensor and the temperature values acquired by the first gas density detection sensors at the same gas temperature; or the background compares and diagnoses the gas density value acquired by the relay body density detection sensor and the gas density values acquired by the first gas density detection sensors at the same gas density to acquire the current working state of the monitoring part of the gas density relay. The relay body density detection sensor includes a body pressure sensor and a body temperature transducer; or uses a body gas density transmitter consisting of a pressure sensor and a temperature transducer; or, is a body density detection sensor using a quartz tuning fork technology. In addition, each of the first gas density detection sensors may only include at least one pressure sensor, and the temperature transducer may use a body temperature transducer. Comparison of the body temperature transducer may be performed by comparing an ambient temperature value with the temperature value acquired by the body temperature transducer of the relay body density detection sensor by means of the intelligent control unit and/or the background, so as to complete check of the body temperature transducer of the relay body density detection sensor. Or, for the same transformer substation, temperature values monitored by temperature transducers of an electrical apparatus X, an electrical apparatus Y and an electrical apparatus Z are $T_X$, $T_Y$ and $T_Z$ respectively, and so on, the background may compare and diagnose the temperature values $T_X$, $T_Y$ and $T_Z$, and if certain temperature value is obviously deviated, a current working state of a temperature transducer of the apparatus is monitored as an abnormal working state; and if the temperature values are basically close, it is indicated that the current working state of the monitoring part of the gas density relay or the gas density monitoring device is the normal working state.

Embodiment 2

Figure 2:
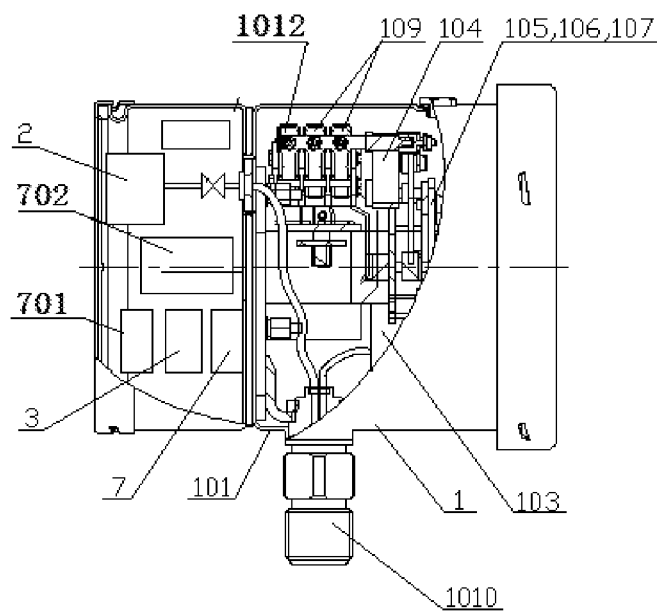
FIG. 2 is a structural schematic diagram of a maintenance-free gas density relay for high-voltage or medium-voltage electrical apparatuses or a gas density monitoring device for high-voltage or medium-voltage electrical apparatuses in embodiment 2.

FIG. 2 is a frontally structural schematic diagram of a maintenance-free gas density relay for a high-voltage electrical apparatus in embodiment 2 of the present disclosure. As shown in FIG. 2, different from embodiment 1, a comparison density value output signal is output in this embodiment. When the gas density relay is provided with the comparison density value output signal, a density value change (or a density value change of the density relay caused by utilizing a temperature regulating mechanism to regulate a temperature compensation element; or a density value change caused by pressure regulation of the pressure regulating mechanism when a gas path is closed) of the gas density relay may be caused by utilizing a temperature difference between the density relay and an electrical apparatus, an intelligent control unit 7 of an electronic part of the gas density relay acquires a gas density value in real time by means of a pressure sensor 2 and a temperature transducer 3, and a pressure detector 103 and a temperature compensation element 104 of a mechanical part of the gas density relay monitors the gas density value in real time. When the gas density value monitored by the gas density relay is reduced or increased to a certain value, the comparison density value output signal is output, and in such a case, the intelligent control unit 7 of the electronic part acquires the gas density value $P_{J20}$ by means of the pressure sensor 2 and the temperature transducer 3; and the pressure detector 103 and the temperature compensation element 104 of the mechanical part monitor the gas pressure value $P_{S20}$ (comparison density value). That is, at the same gas density value, the gas pressure value $P_{S20}$ (comparison density value) detected by the pressure detector 103 and the temperature compensation element 104 of the mechanical part of the gas density relay is compared with the gas density value $P_{J20}$ acquired by the electronic part (mainly by means of the pressure sensor 2 and the temperature transducer 3), and if consistency of the e gas density values is optimal, it is indicated that a monitoring part for monitoring density online of the gas density relay or a gas density monitoring device (or system) works normally without maintenance. That is, if $|P_{J20}-P_{S20}|$ is within an allowable set value of |PJ20−PS20|, it is indicated that the monitoring part for monitoring density online of the gas density relay or the gas density monitoring device (or system) works normally without maintenance.

Embodiment 3

Figure 3:
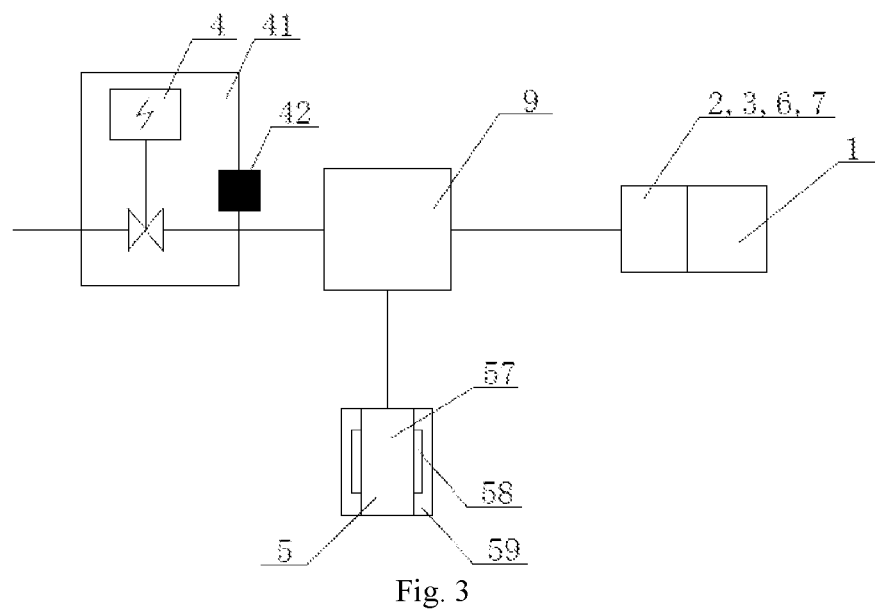
FIG. 3 is a structural schematic diagram of a maintenance-free gas density relay for high-voltage or medium-voltage electrical apparatuses or a gas density monitoring device for high-voltage or medium-voltage electrical apparatuses in embodiment 3.

FIG. 3 is a schematic structural diagram of a maintenance-free gas density relay or a gas density monitoring device for a high-voltage electrical apparatus in embodiment 3 of the present disclosure. As shown in FIG. 3, the maintenance-free gas density relay or the gas density monitoring device in embodiment 3 of the present disclosure includes a gas density relay body 1, a pressure sensor 2, a temperature transducer 3, a valve 4, a pressure regulating mechanism 5, an online check contact signal sampling unit 6, an intelligent control unit 7 and a multichannel joint 9. One end of the valve 4 is in communication with an apparatus connecting joint, and the other end of the valve 4 is connected to the multichannel joint 9. The gas density relay body 1, the pressure sensor 2, the temperature transducer 3, the online check contact signal sampling unit 6 and the intelligent control unit 7 are arranged on the multichannel joint 9; the pressure sensor 2 is in communication with a pressure detector of the gas density relay body 1 on a gas path; the pressure regulating mechanism 5 is mounted on the multichannel joint 9, and the pressure regulating mechanism 5 is in communication with the pressure detector of the gas density relay body 1; the online check contact signal sampling unit 6 and the intelligent control unit 7 are arranged together; and the temperature transducer 3 is arranged near the gas density relay body 1, or near a temperature compensation element inside a housing of the gas density relay body. The pressure sensor 2, the temperature transducer 3, the valve 4 and the pressure regulating mechanism 5 are connected to the intelligent control unit 7 separately. The pressure regulating mechanism 5 in the this embodiment mainly consists of an air chamber 57, a heating element 58, a heat insulation element 59 and a temperature transducer (not shown in the figure). The heating element 58 is arranged outside (or inside) the air chamber 57, and a temperature change is caused by heating, thereby completing pressure rise and fall. Pressure is regulated by means of the pressure regulating mechanism 5, such that the gas density relay body 1 is subjected to contact action, the contact action is transmitted to the intelligent control unit 7 by means of the online check contact signal sampling unit 6, and the intelligent control unit 7 converts a pressure value and a temperature value of the gas density relay body 1 during contact action into corresponding density values PX20, and detects an alarming and/or blocking contact action value and/or return value of the gas density relay body 1 to complete check work of the gas density relay. The heating element 58 may be replaced with a refrigeration element.

The working principle of this embodiment is as follows: when the density relay needs to be checked, the device sends out an instruction to heat the heating element 58 of the pressure regulating mechanism 5, and after a temperature difference between a temperature value of the temperature transducer of the pressure regulating mechanism 5 and a temperature value of the temperature transducer 3 reaches a set value, and the device or system sends out an instruction to close the valve 4 by means of the intelligent control unit 7, so as to separate the gas density relay body 1 from the apparatus connecting joint on a gas path, thereby separating the gas density relay body from the electrical apparatus; then the heating element 58 of the pressure regulating mechanism 5 is immediately turned off to stop heating of the heating element 58, and pressure of gas in a closed air chamber 57 of the pressure regulating mechanism 5 is gradually reduced, such that the gas density relay body 1 gives an alarm and/or blocks contact action, the contact action of the gas density relay body is transmitted to the intelligent control unit 7 by means of the online check contact signal sampling unit 6, and the intelligent control unit 7 detects an alarming and/or blocking contact action value and/or return value of the gas density relay body 1 according to the gas density value during alarming and/or blocking contact action, so as to complete check work of the gas density relay body 1. In this embodiment, a mutual self-check unit mainly consists of the pressure regulating mechanism 5 and the intelligent control unit 7. A gas density change caused by pressure regulation of the pressure regulating mechanism 5 is utilized, a current contact signal value $P_{X20}$ of the gas density relay body 1 is acquired in time by means of the intelligent control unit 7, and the detected contact signal value PX20 of the gas density relay body 1 is compared with a contact signal value $P_{B20}$ required by a standard (rated parameter) of a density relay, if consistency of the contact signal values is optimal, it is indicated that a monitoring part for monitoring density online of the gas density relay or the gas density monitoring device works normally without maintenance. That is, If $|P_{X20}-P_{B20}|$ is within an allowable set value of |PX20−PB20|, it is indicated that the monitoring part for monitoring density online of the gas density relay or the gas density monitoring device works normally without maintenance.

In a word, after the gas density relay completes online check work of the gas density relay body, if abnormity occurs, an alarm may be automatically given, and the abnormity may be uploaded to a far end or may be sent to a specified receiver, for example, to a mobile phone. Or, after the gas density relay completes check work of the gas density relay body, if abnormity occurs, the intelligent control unit 7 may upload the abnormity to a far end (a monitoring room, a background monitoring platform, etc.) by means of an alarm contact signal of the gas density relay body 1, and a notice may further be displayed locally. For simple online check of the gas density relay, a result of abnormal check may be uploaded by means of an alarm signal line and may be uploaded according to a certain rule, for example, during abnormity, and a contact is connected in parallel to an alarm signal contact and is regularly closed and opened to obtain the condition by means of analysis; or the result is uploaded by means of an independent check signal line. Specifically, the result may be uploaded in an optimal state, uploaded in a wrong state, uploaded by means of the independent check signal line, uploaded by means of field display and field alarming, wirelessly uploaded, or uploaded by networking with a smart phone. The communication mode of the gas density relay includes a wire communication mode or a wireless communication mode, where the wire communication mode may be industrial buses of RS232, RS485, controller area network (CAN)-BUS, etc., optical fiber Ethernet, 4-20 mA, Hart, an Inter-integrated circuit (IIC), a serial peripheral interface (SPI), Wire, a coaxial cable, a power line carrier (PLC), etc.; and the wireless communication mode may be 2th generation mobile communication technology (2G)/3th generation mobile communication technology (3G)/4th generation mobile communication technology (4G)/5th generation mobile communication technology (5G), WIFI, Bluetooth, Lora, Lorawan, Zigbee, infrared, ultrasonic, sound wave, satellite, light wave, quantum communication, sonar, a 5G/narrow band Internet of Things (NB-IOT) communication module (for example, 5G, NB-IOT) arranged in a sensor, etc. In a word, multiple modes and multiple combinations may be achieved to fully ensure reliable performance of the gas density relay.

Embodiment 4

Figure 4:
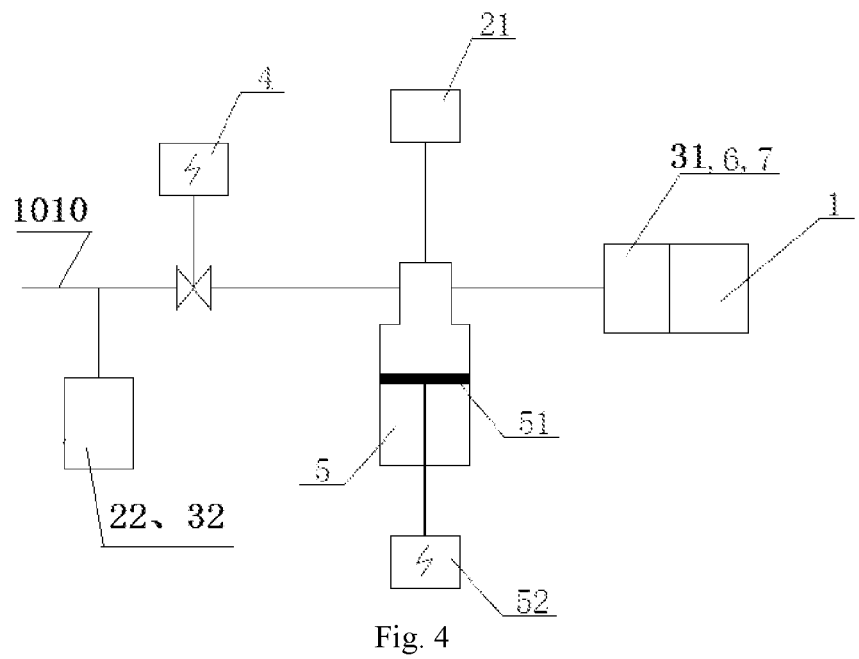
FIG. 4 is a structural schematic diagram of a maintenance-free gas density relay for high-voltage or medium-voltage electrical apparatuses or a gas density monitoring device for high-voltage or medium-voltage electrical apparatuses in embodiment 4.

FIG. 4 is a structural schematic diagram of a maintenance-free gas density relay for a high-voltage electrical apparatus or a gas density monitoring device in embodiment 4 of the present disclosure. As shown in FIG. 4, the maintenance-free gas density relay or the gas density monitoring device of embodiment 4 of the present disclosure includes a gas density relay body 1, a pressure sensor 21, a pressure sensor 22, a temperature transducer 31, a temperature transducer 32, a valve 4, a pressure regulating mechanism 5, an online check contact signal sampling unit 6, an intelligent control unit 7 and an apparatus connecting joint 1010. During operation, one end of the apparatus connecting joint 1010 is in sealed connection with a gas insulation electrical apparatus, and the other end of the apparatus connecting joint 1010 is in communication with the valve 4; and the other end of the valve 4 is in communication with the pressure regulating mechanism 5. The gas density relay body 1, the temperature transducer 31, the online check contact signal sampling unit 6 and the intelligent control unit 7 are arranged together and are arranged on the pressure regulating mechanism 5; and the pressure sensor 21 is arranged on the pressure regulating mechanism 5. The pressure sensor 22 and the temperature transducer 32 are arranged on the side of the apparatus connecting joint 1010 side (the side of the valve 4 connected to the apparatus connecting joint 1010). The pressure sensor 21 and a pressure detector of the gas density relay body 1 are in communication with the pressure regulating mechanism 5 on gas paths; the pressure sensor 21, the pressure sensor 22, the temperature transducer 31 and the temperature transducer 32 are connected to the intelligent control unit 7; the valve 4 is connected to the intelligent control unit 7; and the pressure regulating mechanism 5 is connected to the intelligent control unit 7. In the embodiment, the two pressure sensors are arranged and are the pressure sensor 21 and the pressure sensor 22 respectively; the two temperature transducers are arranged and are the temperature transducer 31 and the temperature transducer 32 respectively. The temperature transducer 32 may be omitted in this case. The maintenance-free gas density relay or the gas density monitoring device of embodiment 4 of the present disclosure is provided with several pressure sensors and several temperature transducers. For example, in the embodiment, a mutual self-check unit consists of two gas density detection sensors A and B. Specifically, pressure values PA and PB respectively detected by gas density detection sensors A and B (the pressure sensor 21, the pressure sensor 22, the temperature transducer 31 and the temperature transducer 32) are utilized for comparison, temperature values $T_A$ and $T_B$ are utilized for comparison, and if consistency of the pressure values is optimal, it is indicated that an online monitoring part of the gas density relay or the gas density monitoring device works normally without maintenance. That is, if $|P_A-P_B|$ and $|T_A-T_B|$ are within allowable set values of |PA–PB| and |TA–TB| respectively, it is indicated that the online monitoring part of the gas density relay or the gas density monitoring device works normally without maintenance, of which the purpose is that the pressure values monitored by the pressure sensor 21 and the pressure sensor 22 may be compared and checked mutually; the pressure values monitored by the temperature sensor 31 and the temperature sensor 32 may be compared and checked mutually; in addition, density values $P_{A20}$ monitored by the pressure sensor 21 and the temperature transducer 31 and density values $P_{B20}$ monitored by the pressure sensor 22 and the temperature transducer 32 may be compared and checked mutually; and that is, the mutual self-check unit consists of a plurality of (at least two) gas density detection sensors A and B, and the density values $P_{A20}$ and $P_{B20}$ detected by the gas density detection sensors A and B respectively are compared, and if consistency of the density values is optimal, it is indicated that the online monitoring part of the gas density relay or the gas density monitoring device works normally without maintenance. That is, if $|P_{A20}-P_{B20}|$ is within an allowable set value of |PA20–PB20|, the online monitoring part of the gas density relay or the density monitoring device works normally without maintenance.

Even rated density values Pea) of the gas density relay body may be obtained by means of online check, and are compared and checked mutually. As long as data of the pressure sensor 21, the pressure sensor 22, the temperature transducer 31, the temperature transducer 32 and the gas density relay body 1 are consistent and normal, it may be indicated that the gas density relay or the gas density monitoring device is normal, such that the gas density relay does not need to be manually checked on site, thereby avoiding full-life manual check. Unless data of the pressure sensor 21, the pressure sensor 22, the temperature transducer 31, the temperature transducer 32 and the gas density relay of a certain electrical apparatus in a transformer substation are inconsistent and abnormal, maintenance personnel are arranged to process the electrical apparatus. For consistent and normal data, check is not needed, thereby greatly improving reliability, improving efficiency, and reducing cost.

The maintenance-free gas density relay for a gas insulation high-voltage electrical apparatus or the gas density monitoring device provided by embodiment 4 of the present disclosure has a safety protection function, which is specifically as follows: 1) no matter according to the pressure sensor 21 and the temperature transducer 31, or according to the pressure sensor 22 and the temperature transducer 32, as long as a monitored density value is lower than a set value, the gas density relay automatically does not check the gas density relay body 1 any more and sends out a notification signal; For example, when the gas density value of the apparatus is less than the set value, check is not carried out. Only when the gas density value of the apparatus≥(blocking pressure+0.02 MPa), check may be carried out. A contact alarm has status indication. 2) or, during check, when the valve 4 is closed and density values monitored by the pressure sensor 22 and the temperature transducer 32 is lower than the set value, the gas density relay automatically no longer checks the gas density relay body 1 and sends out the notification signal (gas leakage). For example, when the gas density value of the apparatus is less than the set value (blocking pressure+0.02 MPa), check is not carried out. The set value may be set as required. Moreover, the gas density relay further has mutual check of the plurality of pressure sensors and the plurality of temperature sensors, and mutual check of the pressure sensors, the temperature transducers and the gas density relay body 1, so as to ensure normal work of the gas density relay.

The gas density relay may compare error performance of the gas density relay at different temperatures in different time periods. That is, the performance of the electrical apparatus and the performance of the gas density relay are determined by means of comparison in different periods and at the same temperature range. The gas density relay has comparison of each period of the history and comparison of the history and the present, and may further be examined. The gas density relay may be repeatedly checked for multiple times (for example, 2-3 times), and according to a check result each time, average values of the check results may be computed. In necessary, the density relay may be checked online at any time.

In the above content, the types of the pressure sensors include absolute pressure sensors, relative pressure sensors, or absolute pressure sensors and relative pressure sensors, and the several pressure sensors may be arranged. The pressure sensors may be in the form of diffused silicon pressure sensors, micro electro mechanical system (MEMS) pressure sensors, chip type pressure sensors, coil induction pressure sensors (for example, pressure measurement sensors having Bourdon tubes attached with induction coils), resistance pressure sensors (for example, pressure measurement sensors having Bourdon tubes attached with slide wire resistors), and may be analog quantity pressure sensors, or digital quantity pressure sensors. Pressure acquisition is various pressure sensing elements of the pressure sensors, pressure transmitters, etc., for example, a diffused silicon type, a sapphire type, a piezoelectric type and a strain gauge type (a resistance strain gauge type and a ceramic strain gauge type). The temperature transducers may be thermocouples, thermistors, and semiconductor types, may be a contact type and a non-contact type, and may be thermal resistors and the thermocouples. In a word, various temperature sensing elements of the temperature transducers, temperature transmitters, etc. may be used for temperature acquisition. The gas density relay body includes a density relay having indication (a pointer display density relay, a digital display density relay, or a liquid crystal display density relay) and a density relay without indication (that is, a density switch).

The gas density relay has pressure, temperature measurement and software conversion functions. On the premise that safe operation of the electrical apparatus is not affected, alarming and/or blocking contact action values and/or return values of the gas density relay may be detected online. Of course, the return values of alarming and/or blocking contact signals may not need to be tested as required.

The intelligent control unit 7 mainly completes valve control, control of the pressure regulating mechanism and signal acquisition. That is, the basic requirements or functions of the intelligent control unit 7 are as follows: control over the valve 4, control over the pressure regulating mechanism 5 and signal acquisition are completed by means of the intelligent control unit 7. The pressure values and the temperature values when a contact signal of the gas density relay body acts may be detected and converted into pressure values $P_{20}$ (density values) corresponding to 20° C., that is, contact action values $P_{D20}$ of the gas density relay may be detected to complete check work of the gas density relay body. Or, the density values $P_{D20}$ when the contact signal of the gas density relay body acts may be directly detected to complete check work of the gas density relay body, which is the most basic requirement. Of course, the intelligent control unit 7 may further achieve: test data storage; and/or test data export; and/or test data printing; and/or may be in data communication with an upper computer; and/or may input analog or digital quantity information. The intelligent control unit 7 further includes a communication module, where long-distance transmission of information of test data, and/or check results, etc. is achieved by means of the communication module. When a rated pressure value of the gas density relay body outputs a signal, the intelligent control unit 7 acquires a current density value at the same time to complete check of the rated pressure value of the gas density relay. The gas density relay may automatically perform comparison and determination, and if an error difference is large, an abnormal prompt is sent out: the pressure detector or the pressure sensors, the temperature transducers, etc. of the gas density relay have problems. That is, the gas density relay may complete a mutual check function of the pressure detector, the pressure sensors, the temperature transducers, a density transmitter, etc. of the gas density relay, and may complete mutual check of the pressure detector, the pressure sensors, the temperature transducers, etc. of the gas density relay. When the gas density relay completes check of the gas density relay, mutual comparison judgment is automatically carried out, and if the error difference is large, an abnormal prompt is sent out that a pressure detector or a pressure sensor, a temperature transducer and the like of the gas density relay have problems. That is, the gas density relay may complete mutual check functions of the pressure detector, or the pressure sensors, the temperature transducers, or the density transmitter of the gas density relay. The gas density relay has an artificial intelligence proofreading capability; may automatically generate a check report of the density relay after completing check work of the gas density relay, and may automatically sends out an alarm, or may send abnormality to a specified receiver, such as a mobile phone if the abnormity occurs; may display the density values and the check result on site, or displays the density values and the check result by means of a background, and may have a flexible specific mode; has the functions of real-time online data display of the density values, the pressure values, the temperature values, etc., change trend analysis, historical data query, real-time alarm, etc.; may monitor the gas density values, or the density values, the pressure values and the temperature values online; has a self-diagnosis function, and may timely notify the abnormity, for example, disconnection, short circuit alarm, sensor damage, etc.; may compare error performance of the gas density relay at different temperatures in different time periods, that is, the performance of the gas density relay is determined by means of comparison in different time periods in the same temperature range; has comparison of each period of the history and comparison of the history and the present; may further be self-checked; and may further determine whether the density values of the gas density relay and the monitored electrical apparatus are normal. That is, the gas density relay may normally and abnormally determine, analyze and compare the density value of the electrical apparatus, the pressure detector, the pressure sensors, the temperature transducers, etc. of the gas density relay, thereby determining, comparing and analyzing states of gas density monitoring of the electrical apparatus, the gas density relay, etc.; further includes an analysis system (an expert management analysis system), which is used for detecting, analyzing and determining gas density monitoring, the gas density relay and a monitoring element to know where a problem point is, and whether the electrical apparatus or the gas density relay has a problem; and may further monitor a contact signal state of the gas density relay body, and remotely transmits the state. The gas density relay may know whether the contact signal state of the gas density relay body is disconnected or closed at the background, thereby adding a layer of monitoring, and improving reliability; may further detect or detect and determine temperature compensation performance of the gas density relay body; may further detect or detect and determine the contact resistance of the contact of the gas density relay body; and has the functions of data analysis, data processing, etc., and may perform corresponding fault diagnosis and prediction on the electrical apparatus.

As long as the detection data of the pressure sensor 2, the temperature transducer 3, the pressure detector 103, the temperature compensation element 104, etc. are matched and normal, it is indicated that the gas density relay is normal, the gas density relay does not need to be checked on site by maintenance personnel in a traditional mode, and full-life manual check may be avoided. Unless the detection data of the pressure sensor 2, the temperature transducer 3, and the pressure detector 103, the temperature compensation element 104, etc. of the gas density relay of a certain electrical apparatus in the transformer substation are inconsistent and abnormal, maintenance personnel are arranged to process the electric apparatus. For consistent and normal data, check is not needed, thereby greatly improving reliability, improving efficiency, and reducing cost.

Embodiment 5

Figure 5:
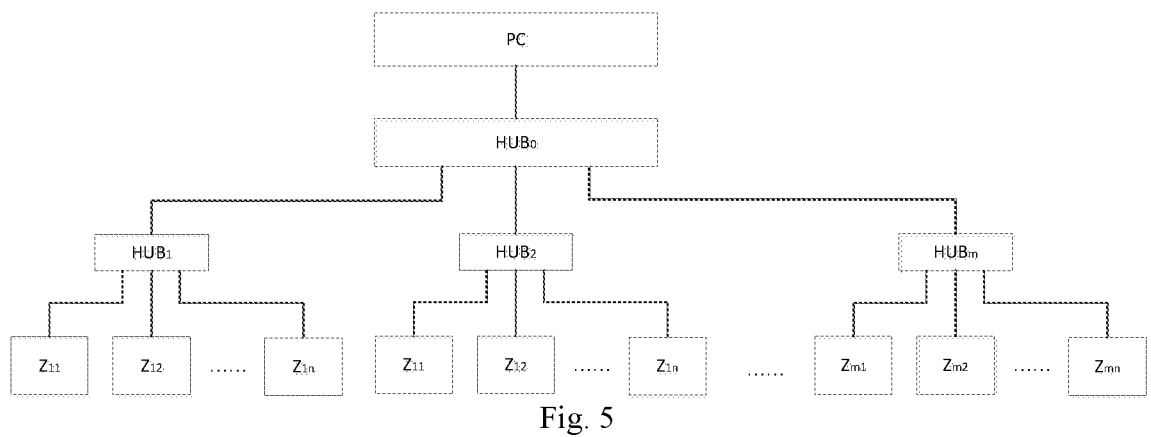
FIGS. 5-7 are structural schematic diagrams of a maintenance-free gas density monitoring system in embodiment 5.
Figure 6:
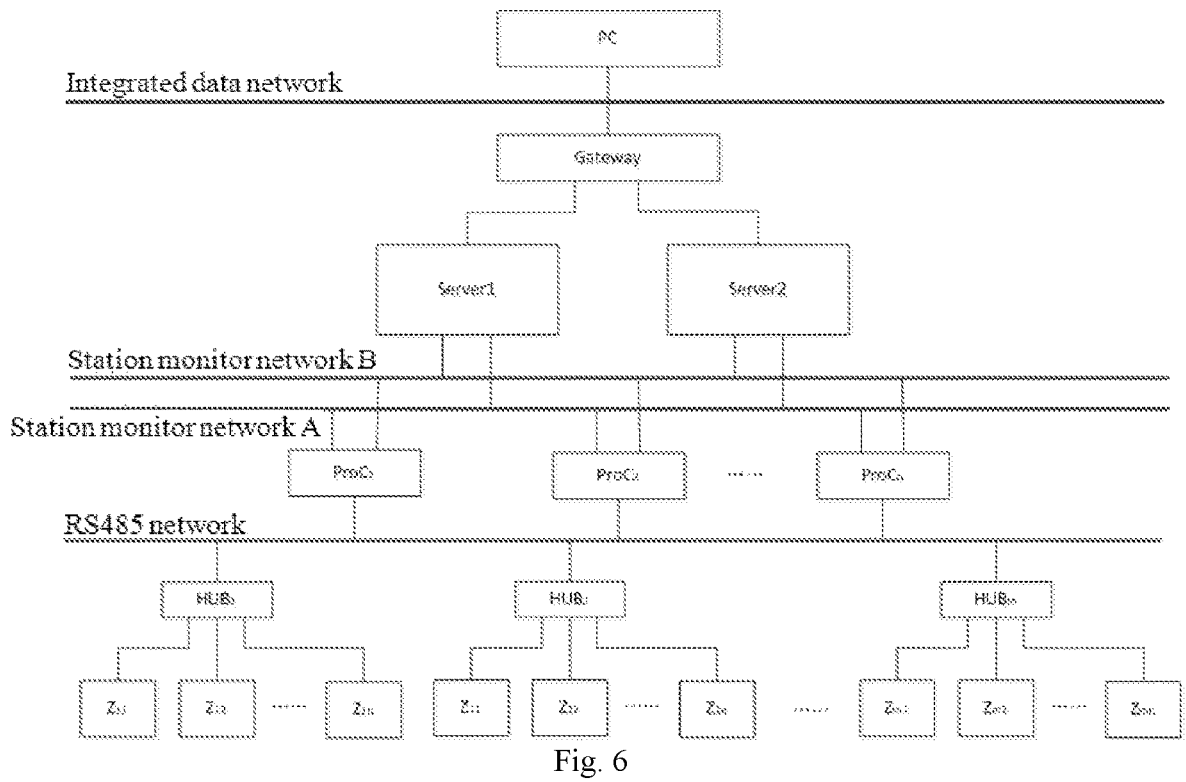
Figure 7:
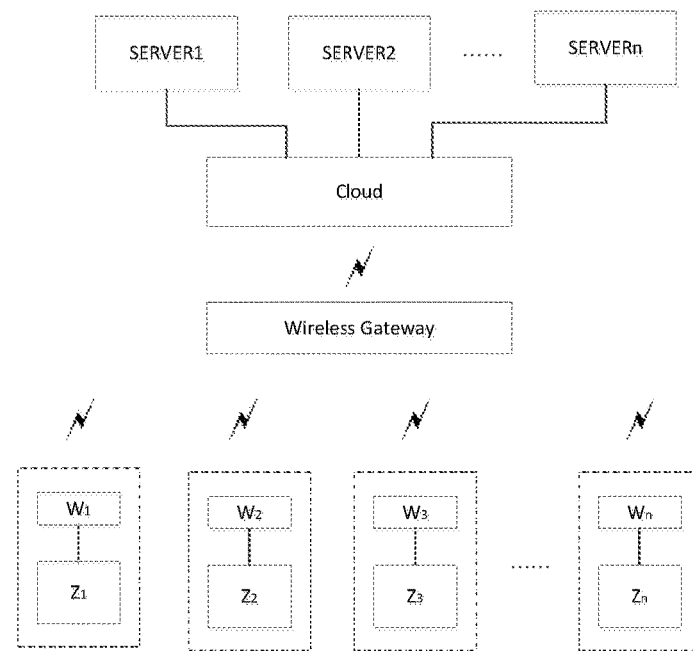

FIGS. 5-7 are a maintenance-free gas density monitoring system. The gas density monitoring system includes the above maintenance-free gas density relays or the above gas density monitoring devices.

As shown in FIG. 5, a plurality of electrical apparatuses having air chambers and a plurality of maintenance-free gas density relays or gas density monitoring devices are sequentially connected with a remote background detection system by means of a concentrator and an integrated Ethernet chip 61850 (IEC61850) protocol converter; and the maintenance-free gas density relays or the gas density monitoring devices are arranged on electrical apparatuses of corresponding air chambers respectively.

As shown in FIGS. 5 and 6, a personal computer (PC) is an online monitoring background host and system, a Gateway is a network switch, a Server is an integrated application server, a ProC is a protocol converter/online monitoring intelligent unit, a HUB is a concentrator, and Z is the maintenance-free gas density relay or the gas density monitoring device. An online monitoring system architecture includes system diagrams of a simple architecture (FIG. 5), a conventional architecture (FIG. 6), a complex architecture, etc.

System architecture diagram and brief description are as follows: 1) a background software platform: based on Windows, Linux and others, or VxWorks, Android, Unix, UCos, FreeRTOS, RTX, embOS and MacOS; 2) a background software key business module and basic functions: for ecammple, authority management, apparatus management, data storage and query, etc., a and user management, alarm management, real-time data, historical data, real-time curve, historical curve, configuration management, data acquisition, data analysis, condition recording and exception processing; and 3) interface configuration: for example, a Form interface, a Web interface, a configuration interface, etc.

FIG. 7 is an architecture system diagram of a wireless transmission mode. A dashed box in the figure indicates that a wireless module Wn and a gas density relay Zn may be integrated or separated, and the specific solution may be flexible. A plurality of integrated application servers Server1, Server2, ..., Server n are in wireless communication with each gas density relay by means of a Cloud, a Wireless Gateway and a wireless module of each gas density relay, where n is a natural number.

The maintenance-free gas density relay or the gas density monitoring device may achieve the following functions that 1) gas density is monitored online, or gas density and micro-water may be monitored online, or gas density, micro-water and decomposer content may be monitored online; 2) the density relay (a contact signal value and a display value of the density relay may be checked online) may be checked online, and 3) reliable performance of the system may be achieved by means of mutual check of electronic detection (monitoring) and mechanical detection (monitoring), such that full-life manual check may be avoided; unless detection data of a pressure sensor 2, a temperature transducer 3 and a gas density relay body 1 of a certain electrical apparatus in a transformer substation are inconsistent or abnormal, maintenance personnel are arranged to handle the electrical apparatus; and for consistent and normal detection data, check is not needed, thereby greatly improving reliability, improving efficiency, and reducing cost; and 4) zero-position check of the pressure sensor 2 may even be carried out.

The maintenance-free gas density relay or the gas density monitoring device has a self-diagnosis function, and may perform self-diagnosis on each element and diagnose a process, for example, a monitoring or checking process; and the gas density relay has self-check and comparison performance.

The maintenance-free gas density relay or the gas density monitoring device includes a plurality of pressure sensors and a plurality of temperature transducers, where mutual check of test data of the plurality of pressure sensors and the plurality of temperature transducers and mutual check of test data of the sensors and a gas density relay body ensure normal work of the gas density relay.

The maintenance-free gas density relay or the gas density monitoring device compares a transmitted ambient temperature value with sampling values of the temperature transducers to complete check of the temperature transducers.

It should be noted that the maintenance-free gas density relay in the present disclosure generally refers to that components of the maintenance-free gas density relay are designed into an integrated structure; and the gas density monitoring device generally refers to that components of the gas density monitoring device are designed into an integrated structure and are flexibly formed. A gas temperature refers broadly to a temperature in gas, or a corresponding ambient temperature. The mutual check method in the present disclosure includes, but not limited to, one of corresponding difference values being within preset thresholds of the corresponding difference values, detection values being within set ranges of the detection values, and two corresponding detection values being divided within a preset threshold of the detection values. In the mutual check method, comparison of corresponding detection results may be completed by an intelligent control unit and/or a background, and the mode may be flexible.

The particular embodiments of the present disclosure are described in detail above, but the particular embodiments of the present disclosure only serve as examples, and the present disclosure is not limited to the particular embodiments described above. For those skilled in the art, any equivalent modification and substitution of the present disclosure fall within the scope of the present disclosure. Therefore, equivalent replacements and modifications made without departing from the spirit and scope of the present disclosure should all fall within the scope of the present disclosure.

What is claimed is:

1. A gas density relay, comprising:
a gas density relay body, first gas density detection sensors and a controller, wherein
the first gas density detection sensors are in communication with the gas density relay body on gas paths and are used for acquiring pressure values and temperature values, and/or gas density values; the controller is connected to the gas density relay body and/or the first gas density detection sensors, and receives and/or computes data monitored by the gas density relay body and the first gas density detection sensors;
the controller compares and checks whether a first pressure value and a second pressure value are the same; and/or the controller compares and checks whether a first temperature value and a second temperature value are a same gas temperature; or the controller compares and checks whether a first density value and a second density value are the same; and when the first pressure value and the second pressure value are the same, and/or when the first temperature value and the second temperature value are the same, and/or when the first density value and the second density value are the same, the controller acquires a current working state of a monitoring part of the gas density relay; or,
the controller transmits received data to a backend server, and the backend server compares and checks the first pressure value and the second pressure value acquired at a same gas pressure; and/or the backend server compares and checks the first temperature value and the second temperature value acquired at a same gas temperature; or the backend server compares and checks the first density value and the second density value acquired at a same gas density to acquire the current working state of the monitoring part of the gas density relay,
one or both of the first pressure value and the second pressure value being from the first gas density detection sensors or the gas density relay body, one or both of the first temperature value and the second temperature value being from the first gas density detection sensors or the gas density relay body, and one or both of the first density value and the second density value being from the first gas density detection sensors or the gas density relay body.

2. The gas density relay according to claim 1, comprising at least two first gas density detection sensors, wherein each of the first gas density detection sensors comprises a pressure sensor and a temperature transducer; and the pressure values and the temperature values or the gas density values detected by the first gas density detection sensors are compared to complete a mutual check of the first gas density detection sensors.

3. The gas density relay according to claim 1, further comprising second gas density detection sensors, wherein each of the first gas density detection sensors and each of the second gas density detection sensors each comprise a pressure sensor and a temperature transducer; and the pressure values and the temperature values or the gas density values of the first gas density detection sensors are compared with pressure values and temperature values or gas density values detected by the second gas density detection sensors to complete a mutual check of the first gas density detection sensors and the second gas density detection sensors.

4. The gas density relay according to claim 1, further comprising a temperature regulating mechanism, wherein the temperature regulating mechanism is a temperature-regulable regulating mechanism, and is configured to regulate temperature rise and fall of a temperature compensation element of the gas density relay body to change gas density of the gas density relay body; with a contact signal value output when a contact of the gas density relay body acts and acquired by the controller being a first density value PX20 and a preset contact signal value being a second density value PB20, the controller and/or the backend server compare/compares the first density value PX20 with the second density value PB20 to acquire a contact signal difference value | PX20−PB20 |; and the current working state of the monitoring part of the gas density relay is determined as a normal working state under the condition that the contact signal difference value | PX20−PB20 | is within a preset threshold of the contact signal difference value, and otherwise, the current working state of the monitoring part of the gas density relay is determined as an abnormal working state.

5. The gas density relay according to claim 1, further comprising a pressure regulating mechanism, wherein the pressure regulating mechanism is a pressure-regulable regulating mechanism, and is configured to regulate pressure rise and fall of the gas density relay body to change gas density of the gas density relay body; with a contact signal value output when a contact of the gas density relay body acts and acquired by the controller being a first density value PX20 and a preset contact signal value being a second density value PB20, the controller and/or the backend server compare/compares the first density value PX20 with the second density value PB20 to acquire a contact signal difference value | PX20−PB20 |; and the current working state of the monitoring part of the gas density relay is determined as a normal working state under the condition that the contact signal difference value | PX20−PB20 | is within a preset threshold of the contact signal difference value, and otherwise, the current working state of the monitoring part of the gas density relay is determined as an abnormal working state.

6. The gas density relay according to claim 1, wherein the gas density relay body comprises a housing, and a base, a pressure detector, a temperature compensation element, a comparison annunciator and at least one signal generator which are arranged in the housing, monitors gas density by means of the pressure detector and the temperature compensation element, and outputs a contact signal value by means of the signal generator;

the gas density relay body further has a comparison pressure value output signal, and the comparison annunciator outputs the comparison pressure value output signal when gas pressure of the gas density relay body monitored by the pressure detector rises or falls to a set gas pressure value, and the comparison pressure value output signal is connected with the controller; and/or, the gas density relay body further has a comparison density value output signal, and the comparison annunciator outputs the comparison density value output signal when gas density of the gas density relay body monitored by the pressure detector and the temperature compensation element rises or falls to a set gas density value, and the comparison density value output signal is connected with the controller, the comparison annunciator comprising one of a microswitch, an electric contact, a mercury switch, a photoelectric switch, a reed switch, a proximity switch, an electronic switch, a variable resistor, a voltage measurer and a current measurer, the signal generator comprising one of a microswitch, an electric contact, a mercury switch, a photoelectric switch, a reed switch, a proximity switch and an electronic switch, and the pressure detector comprising one of a Bourdon tube, a bellow, a bellow and spring combination, and a pressure sensor.

7. The gas density relay according to claim 1, wherein the controller acquires the gas density values acquired by the first gas density detection sensors; or the controller acquires the pressure values and the temperature values acquired by the first gas density detection sensors to monitor gas density by the gas density relay in real time.

8. The gas density relay according to claim 1, wherein the controller acquires the gas density values acquired by the first gas density detection sensors when the gas density relay body is subjected to contact action or switching, so as to complete real time check of the gas density relay; or, the controller acquires the pressure values and the temperature values acquired by the first gas density detection sensors when the gas density relay body is subjected to contact action or switching, and converts the pressure values and the temperature values into pressure values corresponding to 20° C., that is, gas density values according to gas pressure-temperature characteristics, so as to complete a real time check of the gas density relay.

9. The gas density relay according to claim 1, wherein at least two gas density relays are both connected with a remote backend detection system by means of communication apparatuses, the gas density relays being arranged on electrical apparatuses of air chambers corresponding to the gas density relays, and a communication mode of each of the communication apparatuses comprises a wire communication mode and a wireless communication mode.

10. The gas density relay according to claim 1, wherein the gas density relay body comprises one or more of a bimetallic strip compensated gas density relay, a gas compensated gas density relay, a hybrid bimetallic strip and gas compensated gas density relay, a mechanical gas density relay, a digital gas density relay, a mechanical and digital combined gas density relay, a gas density relay having a pointer display, a digital display type gas density relay, a gas density switch without a display, an SF6 gas density relay, an SF6 mixed gas density relay and a N2 gas density relay, the digital gas density relay body being internally provided with the controller, or the controller being separately arranged outside the digital gas density relay body when the gas density relay body is the digital gas density relay.

11. A mutual check method for the gas density relay of claim 1, comprising:

communicating first gas density detection sensors with a gas density relay body on gas paths;

connecting a controller to the gas density relay body and/or the first gas density detection sensors; and comparing and checking, by the controller, whether a first pressure value and a second pressure value are the same; and/or comparing and checking, by the controller, whether a first temperature value and a second temperature value are the same; or comparing and checking, by the controller, whether a first density value and a second density value are the same; and when the first pressure value and the second pressure value are the same, and/or when the first temperature value and the second temperature value are the same, and/or when the first density value and the second density value are the same, the controller acquires a current working state of a monitoring part of the gas density relay; or, communicating, by the controller, received data to a backend server, and comparing and checking, by the backend server, the first pressure value and the second pressure value acquired at a same gas pressure; and/or comparing and checking, by the backend server, the first temperature value and the second temperature value acquired at a same gas temperature; or comparing and checking, by the backend server, the first density value and the second density value acquired at a same gas density to acquire the current working state of the monitoring part of the gas density relay, wherein one or both of the first pressure value and the second pressure value are from the first gas density detection sensors or the gas density relay body; one or both of the first temperature value and the second temperature value are from the first gas density detection sensors or the gas density relay body; and one or both of the first density value and the second density value are from the first gas density detection sensors or the gas density relay body.

12. The mutual check method for the gas density relay according to claim 11, wherein the gas density relay further comprises second gas density detection sensors, each of the first gas density detection sensors and each of the second gas density detection sensors each comprising a pressure sensor and a temperature transducer; and the mutual check method comprises:

with a pressure value acquired by the pressure sensor of any one of the first gas density detection sensors and the second gas density detection sensors being a first pressure value PA, a temperature value acquired by the temperature transducer of any one of the first gas density detection sensors and the second gas density detection sensors being a first temperature value TA, a pressure value acquired by the pressure sensor of any another one of the first gas density detection sensors and the second gas density detection sensors being a second pressure value PB, and a temperature value acquired by the temperature transducer of any another one of the first gas density detection sensors and the second gas density detection sensors being a second temperature value TB, comparing, by the controller or the backend server, the first pressure value PA with the second pressure value PB to acquire a pressure difference | PA−PB|, and comparing, by the controller or the backend server, the first temperature value TA with the second temperature value TB to acquire a temperature difference | TA−TB|; and determining the current working state of the monitoring part of the gas density relay as a normal working state under the condition that the pressure difference | PA−PB| and/or the temperature difference | TA−TB| are/is within preset thresholds of the pressure difference and the temperature difference, and otherwise, determining the current working state of the monitoring part of the gas density relay as an abnormal working state; or, with a gas density value acquired by any one of the first gas density detection sensors and the second gas density detection sensors being a first density value PA20, and a gas density value acquired by any another one of the first gas density detection sensors and the second gas density detection sensors being a second density value PB20, comparing, by the controller and/or the backend server, the first density value PA20 with the second density value PB20 to acquire a density difference | PA20−PB20 |; and determining the current working state of the monitoring part of the gas density relay as the normal working state under the condition that the density difference | PA20−PB20 | is within a preset threshold of the density difference, and otherwise, determining the current working state of the monitoring part of the gas density relay as the abnormal working state.

13. The mutual check method for the gas density relay according to claim 11, wherein each of the first gas density detection sensors comprises at least one pressure sensor and at least one temperature transducer; and the mutual check method comprises:

with a temperature value acquired by any one of the temperature transducers being a first temperature value TA, and an ambient temperature value being a second temperature value TB, comparing, by the controller and/or the backend server, the first temperature value TA with the second temperature value TB to acquire a temperature difference | TA−TB|; and determining the current working state of the monitoring part of the gas density relay as a normal working state without maintenance under the condition that the temperature difference | TA−TB| is within a preset threshold of the temperature difference, and otherwise, determining the current working state of the monitoring part of the gas density relay as an abnormal working state; or, with a pressure value acquired by any one of the pressure sensors being a first pressure value PA, and a pressure value acquired by any another one of the pressure sensors being a second pressure value PB, comparing, by the controller and/or the backend server, the first pressure value PA with the second pressure value PB to acquire a pressure difference | PA−PB|; and determining the current working state of the monitoring part of the gas density relay as the normal working state without maintenance under the condition that the pressure difference | PA−PB| is within a preset threshold of the pressure difference, and otherwise, determining the current working state of the monitoring part of the gas density relay as the abnormal working state; or, with a temperature value acquired by any one of the temperature transducers being a first temperature value TA, and a temperature value acquired by any another one of the temperature transducers being a second temperature value TB, comparing, by the controller and/or the backend server, the first temperature value TA with the second temperature value TB to acquire a temperature difference | TA−TB|; and determining the current working state of the monitoring part of the gas density relay as the normal working state without maintenance under the condition that the temperature difference | TA–TB| is within a preset threshold of the temperature difference, and otherwise, determining the current working state of the monitoring part of the gas density relay as the abnormal working state.

14. The mutual check method for the gas density relay according to claim 11, wherein each of the first gas density detection sensors comprises at least one pressure sensor and at least one temperature transducer; and the mutual check method comprises:
   randomly permutating and combining pressure values acquired by the pressure sensors and temperature values acquired by the temperature transducers, converting combinations into a plurality of pressure values corresponding to 20° C., that is, gas density values according to gas pressure-temperature characteristics, and comparing the gas density values to complete a mutual check of the pressure sensors and the temperature transducers; or,
   fully permutating and combining the pressure values acquired by the pressure sensors and the temperature values acquired by the temperature transducers, converting the combinations into a plurality of pressure values corresponding to 20° C., that is, gas density values according to gas pressure-temperature characteristics, and comparing the gas density values to complete a mutual check of the pressure sensors and the temperature transducers; or,
   comparing the plurality of gas density values, the plurality of pressure values and the plurality of temperature values obtained by the pressure sensors and the temperature transducers to complete a mutual check of the gas density relay body, the pressure sensors and the temperature transducers.

15. The mutual check method for the gas density relay according to claim 11, wherein the gas density relay further comprises a temperature regulating mechanism, the temperature regulating mechanism being a temperature-regulable regulating mechanism, and being configured to regulate temperature rise and fall of a temperature compensation element of the gas density relay body, so as to change a gas density of the gas density relay body; and the mutual check method further comprises:
   arranging the temperature regulating mechanism inside or outside a housing of the gas density relay body;
   connecting the temperature regulating mechanism to the controller;
   with a contact signal value output when a contact of the gas density relay body acts and acquired by the controller being a first density value PX20 and a preset contact signal value being a second density value PB20, comparing, by the controller and/or the backend server, the first density value PX20 with the second density value PB20 to acquire a contact signal difference value | PX20–PB20 |; and determining the current working state of the monitoring part of the gas density relay as a normal working state without maintenance under the condition that the contact signal difference value | PX20–PB20 | is within a preset threshold of the contact signal difference value, and otherwise, determining the current working state of the monitoring part of the gas density relay as an abnormal working state.

16. The mutual check method for the gas density relay according to claim 11, wherein the gas density relay further comprises a pressure regulating mechanism, the pressure regulating mechanism being a pressure-regulable regulating mechanism, and being configured to regulate a pressure rise and fall of the gas density relay body, so as to change gas density of the gas density relay body; and the mutual check method comprises:
   communicating a gas path of the pressure regulating mechanism with a gas path of the gas density relay body;
   connecting the pressure regulating mechanism to the controller;
   with a contact signal value output when a contact of the gas density relay body acts and acquired by the controller being a first density value PX20 and a preset contact signal value being a second density value PB20, comparing, by the controller and/or the backend server, the first density value PX20 with the second density value PB20 to acquire a contact signal difference value | PX20–PB20 |; and determining the current working state of the monitoring part of the gas density relay as a normal working state without maintenance under the condition that the contact signal difference value | PX20–PB20 | is within a preset threshold of the contact signal difference value, and otherwise, determining the current working state of the monitoring part of the gas density relay as an abnormal working state.

17. The mutual check method for the gas density relay according to claim 11, wherein the gas density relay body further has a comparison pressure value output signal and/or a comparison density value output signal, the comparison pressure value output signal being used for monitoring gas pressure by means of a pressure detector of the gas density relay body and being output by means of a comparison annunciator of the gas density relay body, and the comparison density value output signal being used for monitoring gas density by means of the pressure detector and a temperature compensation element of the gas density relay body and being output by means of the comparison annunciator of the gas density relay body; and the mutual check method further comprises:
   connecting the comparison pressure value output signal with the controller; and/or,
   connecting the comparison density value output signal with the controller;
   with the comparison pressure value output signal output by the comparison annunciator being a first pressure value PS, and pressure values acquired by the first gas density detection sensors at the same moment being second pressure values PJ, comparing, by the controller and/or the backend server, the first pressure value PS with the second pressure values PJ to acquire pressure differences | PJ–PS|; and
   determining the current working state of the monitoring part of the gas density relay as a normal working state without maintenance under the condition that the pressure differences | PJ–PS| are within a preset threshold of the pressure differences, and otherwise, determining the current working state of the monitoring part of the gas density relay as an abnormal working state; and/or,
   with the comparison density value output signal output by the comparison annunciator being a first density value PS20, and gas density values acquired by the first gas density detection sensors at the same moment being second density values PJ20, comparing, by the controller and/or the backend server, the first density value PS20 with the second density values PJ20 to acquire density differences | PJ20–PS20|; and determining the current working state of the monitoring part of the gas density relay as the normal working state without maintenance under the condition that the density differences | PJ20−PS20| are within a preset threshold of the density differences, and otherwise, determining the current working state of the monitoring part of the gas density relay as the abnormal working state.

18. The mutual check method for the gas density relay according to claim 17, wherein the gas density relay further comprises a camera, the camera being connected to the controller; and the mutual check method further comprises: with a pointer display value or a number display value of the gas density relay body acquired by the camera by means of a head portrait recognition technology being a first density value PZ20 and gas density values acquired by the first gas density detection sensors at the same moment being second density values PJ20, comparing, by the controller and/or the backend server, the first density value PZ20 with the second density values PJ20 to acquire density differences | PJ20−PZ20|; and determining the current working state of the monitoring part of the gas density relay as a normal working state without maintenance under the condition that the density differences | PJ20−PZ20| are within a preset threshold of the density differences, and otherwise, determining the current working state of the monitoring part of the gas density relay as an abnormal working state.

* * * * *